United States Patent
Endo et al.

(10) Patent No.: US 10,670,090 B2
(45) Date of Patent: Jun. 2, 2020

(54) CLUTCH STRUCTURE

(71) Applicant: YAMAHA HATSUDOKI KABUSHIKI KAISHA, Iwata-shi, Shizuoka (JP)

(72) Inventors: Mamoru Endo, Shizuoka (JP); Makoto Sato, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 130 days.

(21) Appl. No.: 16/027,406

(22) Filed: Jul. 5, 2018

(65) Prior Publication Data
US 2019/0063514 A1 Feb. 28, 2019

(30) Foreign Application Priority Data
Aug. 22, 2017 (JP) .................. 2017-159747

(51) Int. Cl.
| | | |
|---|---|---|
| *F16D 43/18* | (2006.01) | |
| *F16D 47/04* | (2006.01) | |
| *F16D 41/063* | (2006.01) | |
| *B60K 17/02* | (2006.01) | |
| *B60K 17/08* | (2006.01) | |
| *B60K 17/26* | (2006.01) | |

(52) U.S. Cl.
CPC .............. *F16D 43/18* (2013.01); *B60K 17/02* (2013.01); *B60K 17/08* (2013.01); *B60K 17/26* (2013.01); *F16D 41/063* (2013.01); *F16D 47/04* (2013.01); *B60Y 2200/124* (2013.01)

(58) Field of Classification Search
CPC .......... F16D 41/04; F16D 41/07; F16D 43/14; F16D 43/18; F16D 2043/145; F16D 47/04
See application file for complete search history.

(56) References Cited

U.S. PATENT DOCUMENTS 3,367,465 A * 2/1968 Newman ................. F16D 43/18
  192/105 BA
6,076,624 A    6/2000 Izumi et al.

FOREIGN PATENT DOCUMENTS

JP    10-297294 A    11/1998

* cited by examiner

*Primary Examiner* — David R Morris
(74) *Attorney, Agent, or Firm* — Keating and Bennett, LLP

(57) ABSTRACT

A clutch structure includes a clutch input shaft, a clutch output shaft, a weight member, a one-way clutch, and a bearing. The weight member frictionally contacts a cylindrical portion of the clutch output shaft to transmit a rotational power from the clutch input shaft to the clutch output shaft and separates from the cylindrical portion to disconnect the transmission of the rotational power. When the weight member separates from the cylindrical portion and a rotational frequency of the clutch input shaft falls below a rotational frequency of the clutch output shaft, the one-way clutch links an input shaft portion of the clutch input shaft and an output shaft portion of the clutch output shaft. The one-way clutch and the bearing are located between the input shaft portion and the output shaft portion.

12 Claims, 10 Drawing Sheets

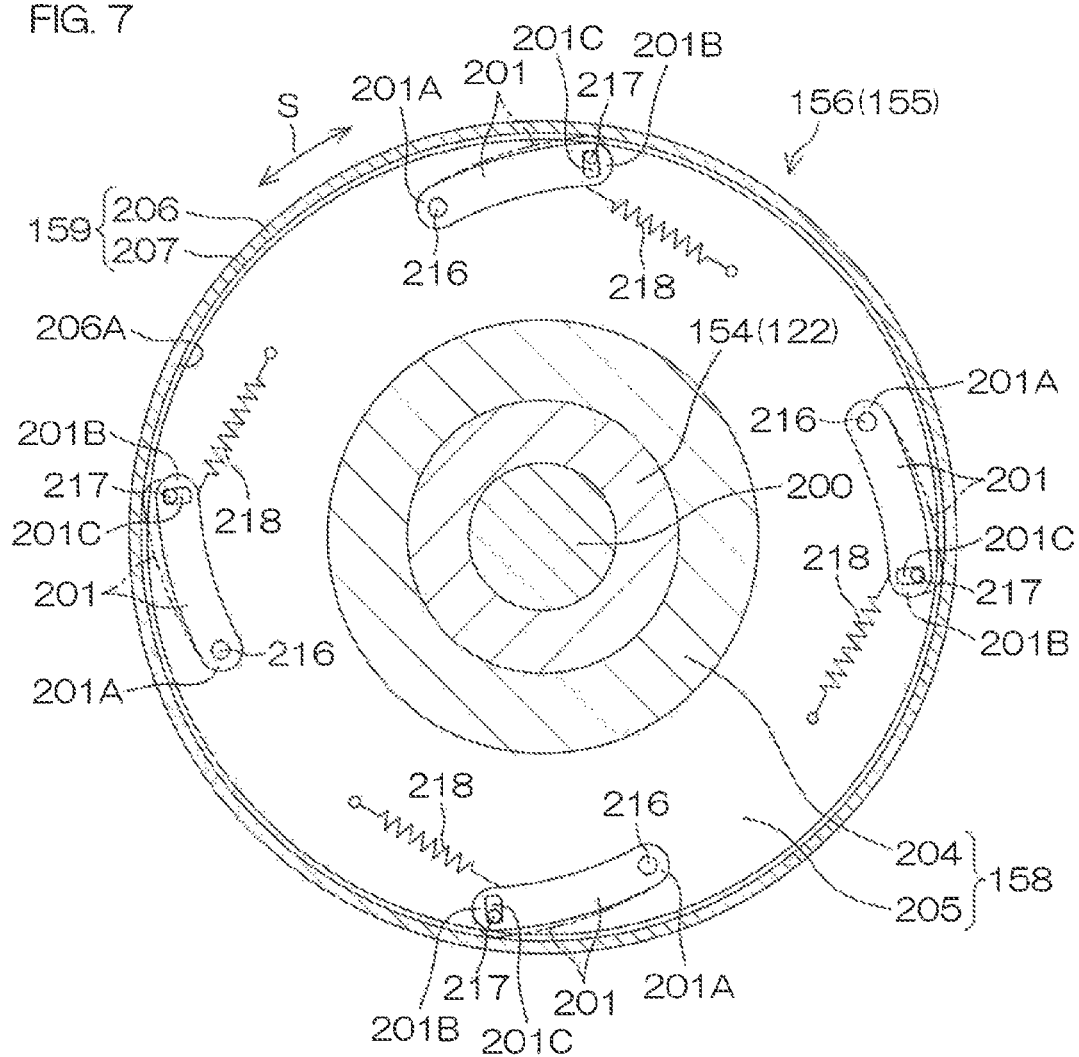

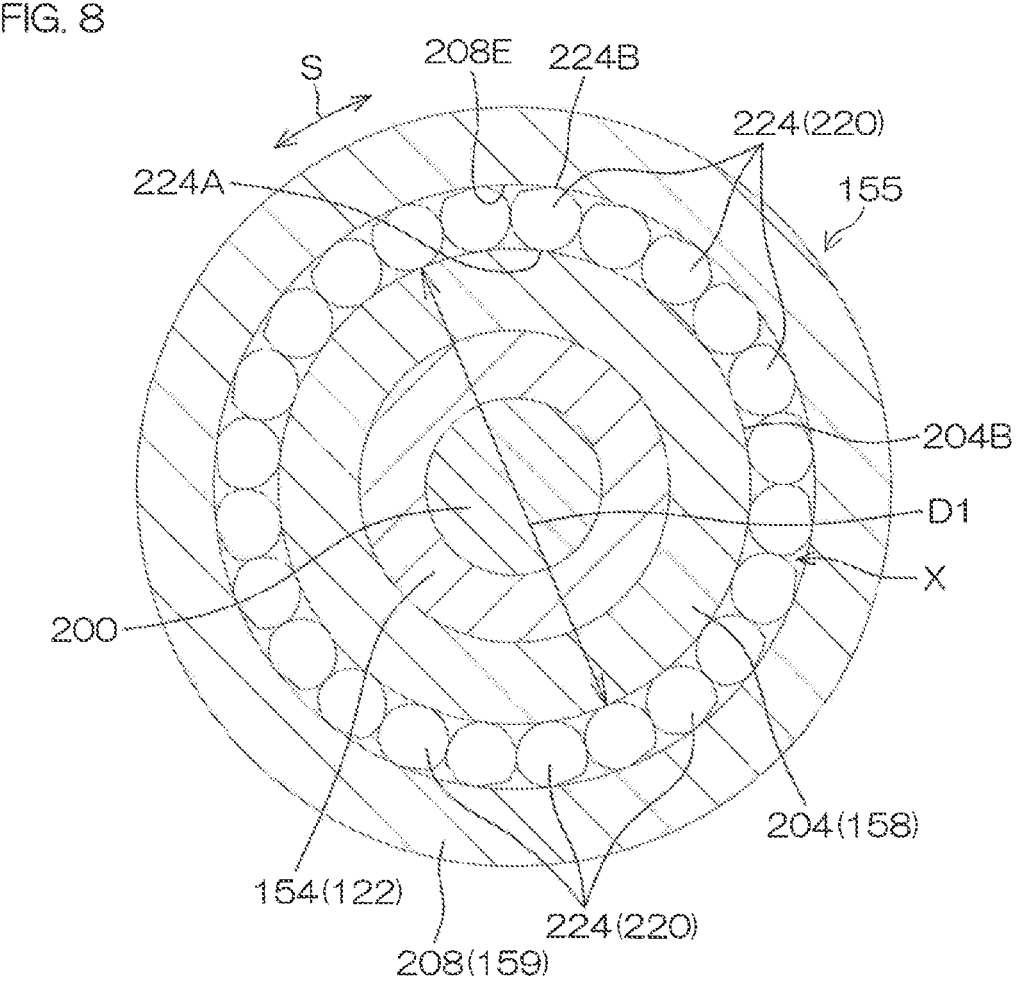

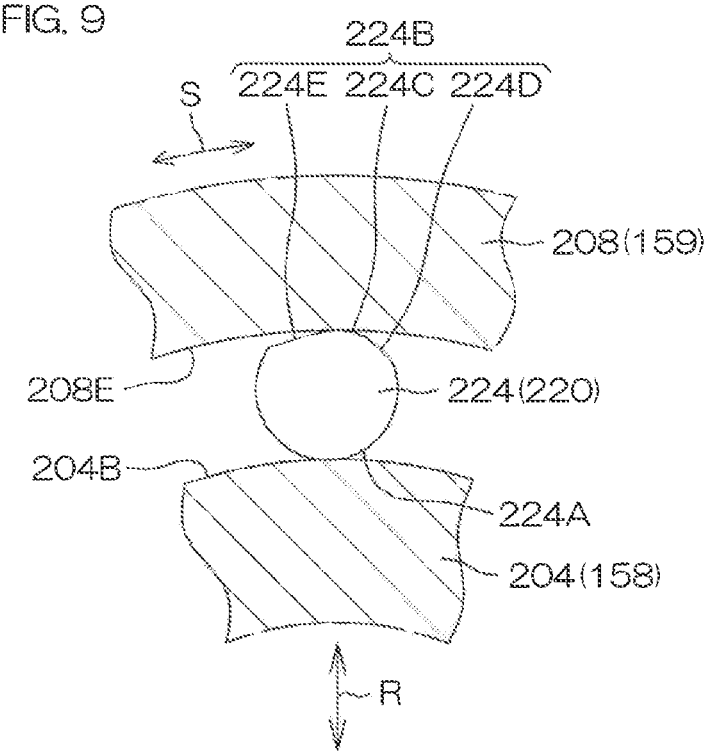
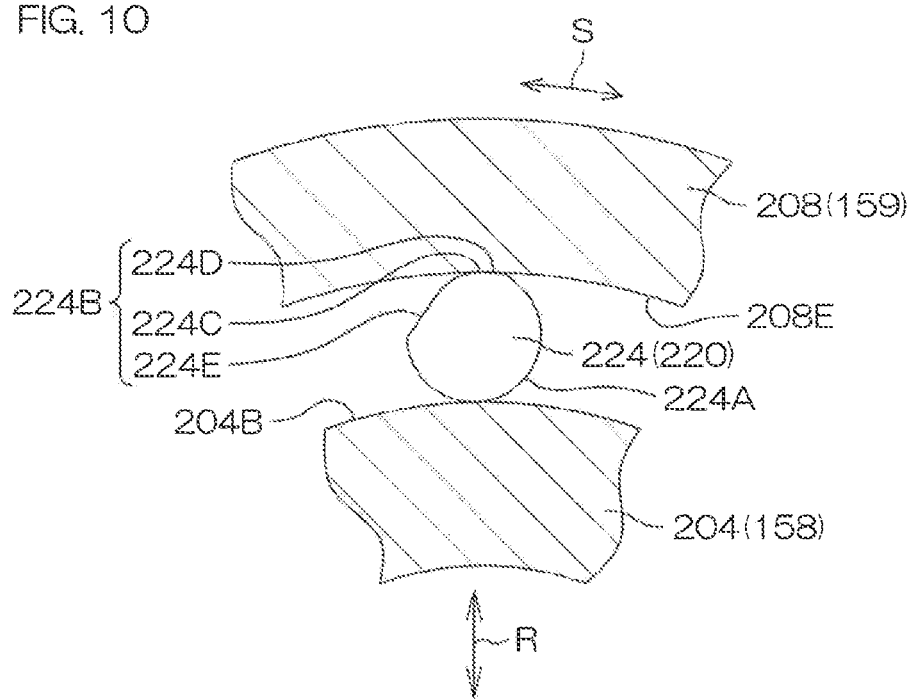

CLUTCH STRUCTURE

CROSS REFERENCE TO RELATED APPLICATIONS

This application claims the benefit of priority to Japanese Patent Application No. 2017-159747 filed on Aug. 22, 2017. The entire contents of this application are hereby incorporated herein by reference.

BACKGROUND OF THE INVENTION

1. Field of the Invention

The present invention relates to a clutch structure used in a vehicle, etc.

2. Description of the Related Art

A vehicle disclosed in Japanese Patent Application Publication No. 10-297294 includes an engine located in a vehicle body, a centrifugal clutch, and a V-belt continuously variable transmission. The centrifugal clutch and the V-belt continuously variable transmission are located inside a crankcase of the engine. The centrifugal clutch includes a clutch input shaft integrally rotatable with a crankshaft of the engine, and a clutch output shaft integrally rotatable with a primary shaft of the V-belt continuously variable transmission. The centrifugal clutch further includes an inner plate fixed to the clutch input shaft, and a centrifugal weight shoe supported by the inner plate. The centrifugal weight shoe is swingably supported by a fulcrum pin fixed to the inner plate. The centrifugal clutch further includes a clutch housing fixed to the clutch output shaft. The centrifugal weight shoe is located inside the clutch housing. When a rotational frequency of the clutch input shaft exceeds a predetermined value, the centrifugal weight shoe swings outward and comes in sliding contact with the clutch housing. A rotational force is thereby transmitted from the clutch input shaft to the clutch output shaft and the clutch output shaft rotates integrally with the clutch input shaft. Thus, due to a rotational frequency of the engine (rotational frequency of the crankshaft) exceeding the predetermined value, a rotational power of the engine is output from the clutch output shaft. The clutch output shaft is supported by the crankshaft via a bearing.

The clutch input shaft and the clutch output shaft are partially overlapped and located coaxially. A one-way clutch for engine braking is located between the clutch input shaft and the clutch output shaft.

One example of a one-way clutch is an annular cam clutch including a plurality of cams. The cam clutch includes a plurality of annularly located cams and a holder holding the plurality of cams. When the cam clutch is applied as the one-way clutch described in Japanese Patent Application Publication No. 10-297294, the plurality of cams are located annularly between the clutch input shaft and the clutch output shaft. During idling of the engine, the crankshaft, the clutch input shaft, and the inner plate rotate idly and the one-way clutch is not actuated. In this state, the cams slip with respect to the clutch input shaft or the clutch output shaft and allow relative rotations thereof. When the centrifugal clutch enters a connected state due to the rotational frequency of the crankshaft exceeding the predetermined value, the clutch input shaft and the clutch output shaft rotate at an equal speed in the same direction. On the other hand, when the centrifugal clutch becomes disconnected and the rotational frequency of the clutch output shaft exceeds the rotational frequency of the clutch input shaft due to the rotational frequency of the crankshaft becoming not more than the predetermined value, the one-way clutch is actuated. That is, the cams become impinged against both the clutch input shaft and the clutch output shaft. A rotational force of the clutch output shaft is thereby transmitted to the clutch input shaft via the one-way clutch. Consequently, engine braking occurs.

To reliably actuate the one-way clutch, it is required that the clutch input shaft and the clutch output shaft are located coaxially, an interval therebetween is uniform in a circumferential direction, and the plurality of cams are located in the uniform interval. If the interval is non-uniform, the actuation reliability of the one-way clutch is decreased by movements of the cams being dulled. Therefore, in regard to coaxial precision of the clutch input shaft and the clutch output shaft, a required coaxial precision must be secured such that the interval between the clutch input shaft and the clutch output shaft is uniform in the circumferential direction. The coaxial precision refers to a magnitude of deviation of a rotational axis of the clutch output shaft with respect to a rotational axis of the clutch input shaft. To secure the required coaxial precision is to keep the magnitude of the deviation not more than a predetermined standard value.

With the arrangement disclosed in Japanese Patent Application Publication No. 10-297294, the bearing between the crankshaft and the clutch output shaft (and therefore between the clutch input shaft and the clutch output shaft) is located at a position separated in an axial direction from the one-way clutch. Therefore, to secure the required coaxial precision of the clutch input shaft and the clutch output shaft at a periphery of the one-way clutch, considerable steps such as highly precise setting of the position of the clutch input shaft and the clutch output shaft and advanced tolerance control of these shafts are required in the manufacturing process. Further, with the arrangement disclosed in Japanese Patent Application Publication No. 10-297294, an inner circumferential portion of the bearing is supported by the crankshaft, an inner circumferential portion of the one-way clutch is supported by the clutch input shaft, and therefore the bearing and the one-way clutch are supported by different members. With such an arrangement, a mounting error of the bearing with respect to the crankshaft and a mounting error of the one-way clutch with respect to the clutch input shaft affect the coaxial precision of the clutch input shaft and the clutch output shaft cumulatively and therefore considerable steps are required in the manufacturing process to secure the required coaxial precision.

SUMMARY OF THE INVENTION

In order to overcome the previously unrecognized and unsolved challenges described above, preferred embodiments of the present invention provide clutch structures that include a clutch input shaft, a clutch output shaft located coaxially with the clutch input shaft, a weight member, an annular one-way clutch, and an annular first bearing. The clutch input shaft includes an input shaft portion splined to a drive shaft, and a first flange portion extending outward in a radial direction from the input shaft portion. The clutch output shaft includes a cylindrical portion surrounding the first flange portion in a circumferential direction, a second flange portion extending inward in the radial direction from the cylindrical portion, and an output shaft portion coupled to the second flange portion. The weight member is supported by the first flange portion so as to be movable in the radial direction. When a rotational frequency of the clutch input shaft exceeds a predetermined value, the weight member is made to frictionally contact an inner circumferential surface of the cylindrical portion due to centrifugal force to transmit a rotational power from the clutch input shaft to the clutch output shaft. When the rotational frequency of the clutch input shaft becomes not more than the predetermined value, the weight member separates from the inner circumferential surface of the cylindrical portion to disconnect the transmission of the rotational power from the clutch input shaft to the clutch output shaft. The one-way clutch is located between the input shaft portion and the output shaft portion. When the weight member separates from the inner circumferential surface of the cylindrical portion and the rotational frequency of the clutch input shaft falls below a rotational frequency of the clutch output shaft, the one-way clutch links the input shaft portion and the output shaft portion. The first bearing is located between the input shaft portion and the output shaft portion and supports the input shaft portion and the output shaft portion so as to be relatively rotatable.

In accordance with a preferred embodiment of the present invention, the annular one-way clutch and the first bearing are both located between the input shaft portion of the clutch input shaft and the output shaft portion of the clutch output shaft. The one-way clutch and the first bearing are thus able to be located in proximity to each other in an axial direction of the clutch input shaft. Coaxial precision required of the input shaft portion and the output shaft portion that support the one-way clutch is thus able to be secured by the first bearing. Further, inner circumferential portions of the one-way clutch and the first bearing are supported by a common member, that is, the input shaft portion. In this case, a mounting error of the one-way clutch with respect to the input shaft portion and a mounting error of the first bearing with respect to the input shaft portion do not cumulatively affect the coaxial precision of the clutch input shaft and the clutch output shaft that support the one-way clutch. Therefore, the required coaxial precision is secured without having to take considerable steps, such as highly precise setting of the position of the clutch input shaft and the clutch output shaft and advanced tolerance control of these shafts. This enables reliable actuation of the one-way clutch even if considerable steps are not taken in the manufacturing process of the clutch structure.

In a preferred embodiment of the present invention, the one-way clutch and the first bearing contact an outer circumferential surface of the input shaft portion. A structural arrangement is thus provided such that a mounting error of the one-way clutch with respect to the outer circumferential surface of the input shaft portion and a mounting error of the first bearing with respect to the outer circumferential surface of the input shaft portion do not cumulatively affect the coaxial precision of the clutch input shaft and the clutch output shaft that support the one-way clutch.

In a preferred embodiment of the present invention, the one-way clutch and the first bearing contact an inner circumferential surface of the output shaft portion. A structural arrangement is thus provided such that a mounting error of the one-way clutch with respect to the inner circumferential surface of the output shaft portion and a mounting error of the first bearing with respect to the inner circumferential surface of the output shaft portion do not cumulatively affect the coaxial precision of the clutch input shaft and the clutch output shaft that support the one-way clutch.

In a preferred embodiment of the present invention, the one-way clutch is located adjacent to the first bearing in the axial direction of the clutch input shaft. This structural arrangement provides the coaxial precision required of the input shaft portion and the output shaft portion that support the one-way clutch to be secured by the first bearing, thus securing reliable actuation of the one-way clutch.

In a preferred embodiment of the present invention, the clutch structure further includes a second bearing surrounding and rotatably supporting the output shaft portion. In this case, the first bearing is preferably located between the one-way clutch and the second bearing in the axial direction. This structural arrangement reliably enables the one-way clutch and the first bearing to be located adjacent to each other in the axial direction.

In a preferred embodiment of the present invention, at least a portion of the first bearing overlaps with the second bearing when viewed from the radial direction. This structural arrangement enables the one-way clutch to be located adjacent to the first bearing in the axial direction even more reliably.

In a preferred embodiment of the present invention, an inner diameter of the one-way clutch and an inner diameter of the first bearing are the same or substantially the same. In accordance with this preferred embodiment, the respective inner circumferential portions of the one-way clutch and the first bearing are located collectively at portions that are the same or substantially the same in outer diameter in the input shaft portion. The one-way clutch and the first bearing are thus located in proximity to each other in the axial direction. The coaxial precision required of the input shaft portion and the output shaft portion that support the one-way clutch is thus secured by the first bearing, therefore securing reliable actuation of the one-way clutch.

In a preferred embodiment of the present invention, the clutch structure further includes a connector that connects the input shaft portion to the drive shaft. This structural arrangement enables the input shaft portion which is splined to the drive shaft to be fixed to the drive shaft so as not to become detached from the drive shaft inadvertently.

In a preferred embodiment of the present invention, the connector is a bolt, at least a portion of which is located inside the input shaft portion. In accordance with this preferred embodiment, a threaded portion which would need to be provided on an outer circumferential surface of the drive shaft or the input shaft portion if the connector is a nut, is unnecessary, thus enabling a dimension of the drive shaft or the input shaft portion in the axial direction to be small. Further, the bolt, which is an elongated member, is more readily twisted during rotation of the drive shaft and the clutch input shaft than a nut. When the bolt is twisted, a threaded portion of the bolt engages firmly with a threaded portion of a member thread-fastened to the bolt at the drive shaft or the input shaft portion, thus preventing loosening of the connector.

In a preferred embodiment of the present invention, the first bearing is a needle bearing.

In a preferred embodiment of the present invention, the drive shaft is a crankshaft of an engine.

In a preferred embodiment of the present invention, the output shaft portion is linked to an input shaft of a shiftable transmission that transmits a rotational power from the drive shaft to a vehicle wheel.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a sectional view taken along line VII-VII of FIG. 6B.

FIG. 8 is a sectional view taken along line VIII-VIII of FIG. 6B.

FIG. 9 is an enlarged view extracting a portion of FIG. 8.

FIG. 10 is a view, corresponding to FIG. 9, of a state when a one-way clutch in the clutch structure is actuated.

DETAILED DESCRIPTION OF THE PREFERRED EMBODIMENTS

In the preferred embodiments of the present invention described below, front-rear, right-left, and up-down are directions defined based on a viewpoint of a driver sitting on a seat of a vehicle and facing a steering wheel. The right-left direction is a vehicle width direction of the vehicle. Also, the description shall be provided based on a state where the vehicle is on a horizontal plane.

Figure 1:
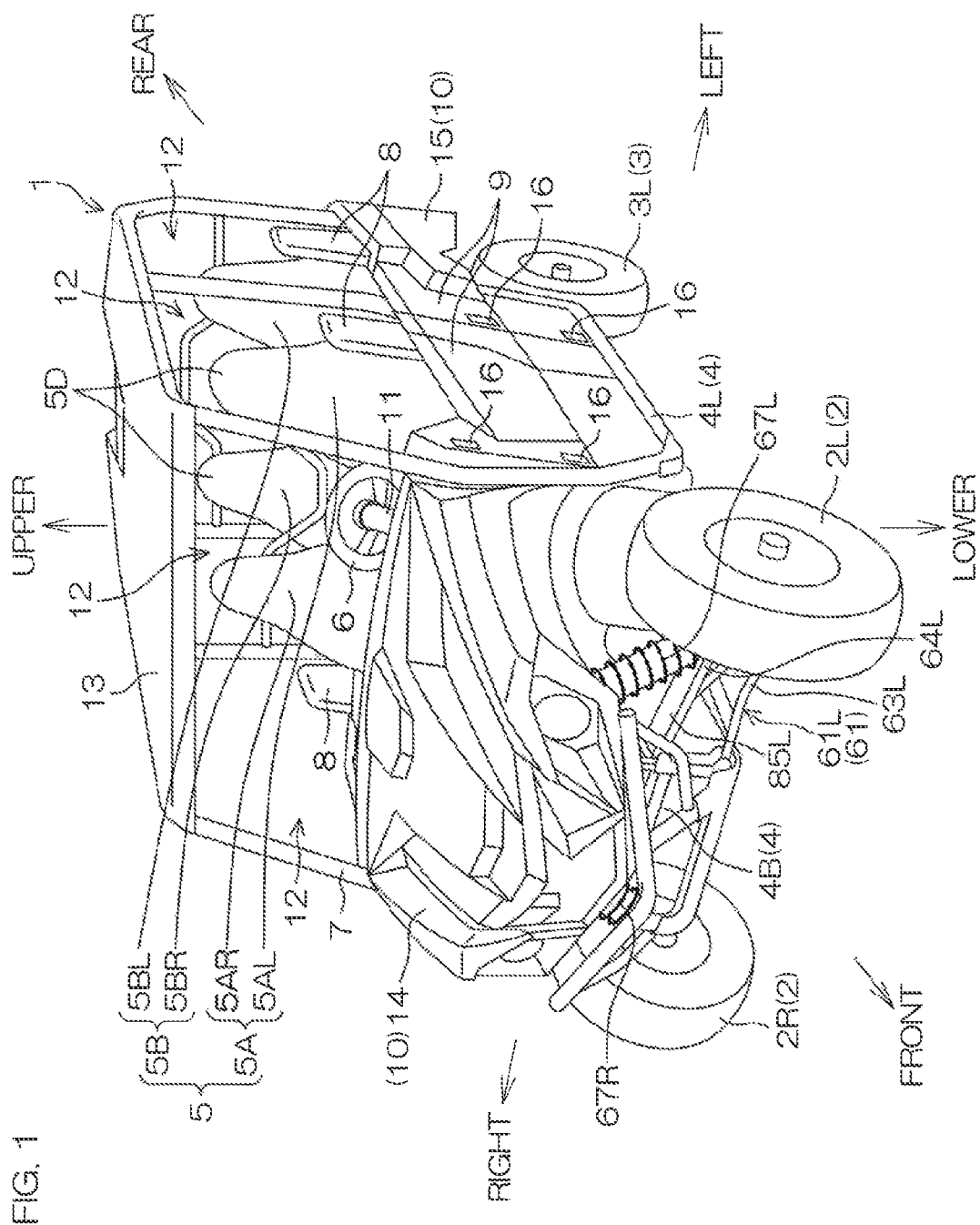
FIG. 1 is a schematic perspective view of a vehicle according to a preferred embodiment of the present invention.

FIG. 1 is a schematic perspective view of the vehicle 1 according to a preferred embodiment of the present invention. The vehicle 1 is preferably a utility vehicle and more specifically is preferably a four-wheel drive, all-terrain vehicle that is called a recreational off-road vehicle and travels through forests, deserts, etc.

The vehicle 1 includes a pair of right and left front wheels 2, a pair of right and left rear wheels 3, a frame 4, at least one seat 5, a steering wheel 6, a roll cage 7, bolsters 8, doors 9, and a body panel 10.

The pair of right and left front wheels 2 include a right front wheel 2R and a left front wheel 2L that are aligned in the right-left direction. The pair of right and left rear wheels 3 include a right rear wheel 3R and a left rear wheel 3L that are aligned in the right-left direction and located farther rearward than the front wheels 2. Each of the left front wheel 2L, right front wheel 2R, left rear wheel 3L, and right rear wheel 3R includes a tire. Recesses and projections in a block pattern to travel on rough terrain may be provided on a surface of each tire. A wheelbase of the vehicle 1 is preferably short and the vehicle width is narrow in order to travel with good maneuverability even in narrow locations such as between trees, etc.

The frame 4 defines a vehicle body of the vehicle 1. The frame 4 is supported by the pair of right and left front wheels 2 and the pair of right and left rear wheels 3. The frame 4 is preferably made of a metal, such as iron or aluminum, etc., and includes an intermediate frame 4A, a left frame 4L, a right frame 4R, a front frame 4B, a rear frame 4C, and an upper frame 4D (see FIG. 2 described below). The left frame 4L is provided at the left of the intermediate frame 4A. The right frame 4R is provided at the right of the intermediate frame 4A. The front frame 4B is provided in front of the intermediate frame 4A. The rear frame 4C is provided at the rear of the intermediate frame 4A. The upper frame 4D is provided above the rear frame 4C.

The vehicle 1 of the present preferred embodiment preferably seats four people, for example. Accordingly, the seats 5 include a pair of right and left front seats 5A and a pair of right and left rear seats 5B. The front seats 5A and the rear seats 5B are respectively located such that a plurality of occupants are seated alongside each other in the right-left direction. The pair of right and left front seats 5A include a right front seat 5AR and a left front seat 5AL that are aligned in the right-left direction. The pair of right and left rear seats 5B include a right rear seat 5BR and a left rear seat 5BL that are aligned in the right-left direction and located farther rearward than the front seats 5A. One of the front seats 5A, for example, the left front seat 5AL is a driver's seat on which the driver sits while facing forward. Each of the seats 5 includes a seat portion 5C and a backrest 5D rising from a rear end of the seat portion 5C, and an upper surface of the seat portion 5C is a seat surface 5E of the seat 5 (see FIG. 3 described below). The seat surface 5E may be a horizontal or substantially horizontal flat surface or may be a downwardly recessed, concave, curved surface. The seat surfaces 5E of the left front seat 5AL and the right front seat 5AR are mutually at the same or substantially the same height position. The seat surfaces 5E of the left rear seat 5BL and the right rear seat 5BR are mutually at the same or substantially the same height position. The seat surfaces 5E of the front seats 5A and the seat surfaces 5E of the rear seats 5B may be at the same or substantially the same height position.

The steering wheel 6 is located in front of the left front seat 5AL. A steering shaft 11 is mounted so as to be rotatable around its axis to the frame 4. The steering wheel 6 is coupled to a rear end of the steering shaft 11.

The roll cage 7 is mounted to the frame 4 and surrounds the pair of front seats 5A and the rear seats 5B. The roll cage 7 defines openings 12, one each at the left of the left front seat 5AL, the right of the right front seat 5AR, the left of the left rear seat 5BL, and the right of the right rear seat 5BR, for boarding and exiting of the occupants. A roof 13 is coupled to an upper portion of the roll cage 7.

The bolsters 8 are plate members made of, for example, resin and one each is provided adjacent to the left of the left front seat 5AL, adjacent to the right of the right front seat 5AR, adjacent to the left of the left rear seat 5BL, and adjacent to the right of the right rear seat 5BR. Each bolster 8 faces the occupant seated on the corresponding seat 5 from the outer side in the right-left direction and helps contain the occupant.

The doors 9 are provided one each at each opening 12, are mounted to the frame 4 via hinges 16, and are able to open and close by swinging around vertical axes. Each of the doors 9 in FIG. 1 is at a closed position and closes a lower region of an opening 12. When an occupant swings a door 9 outward, the door 9 is located at an open position and opens the lower region of an opening 12.

The body panel 10 is made, for example, of resin and is mounted to the frame 4. The body panel 10 includes a front panel 14 covering a front portion of the vehicle 1 farther forward than the front seats 5A, and a rear panel 15 covering a rear portion of the vehicle 1 farther rearward than the rear seats 5B. The doors 9 may define a portion of the body panel 10.

Figure 2:
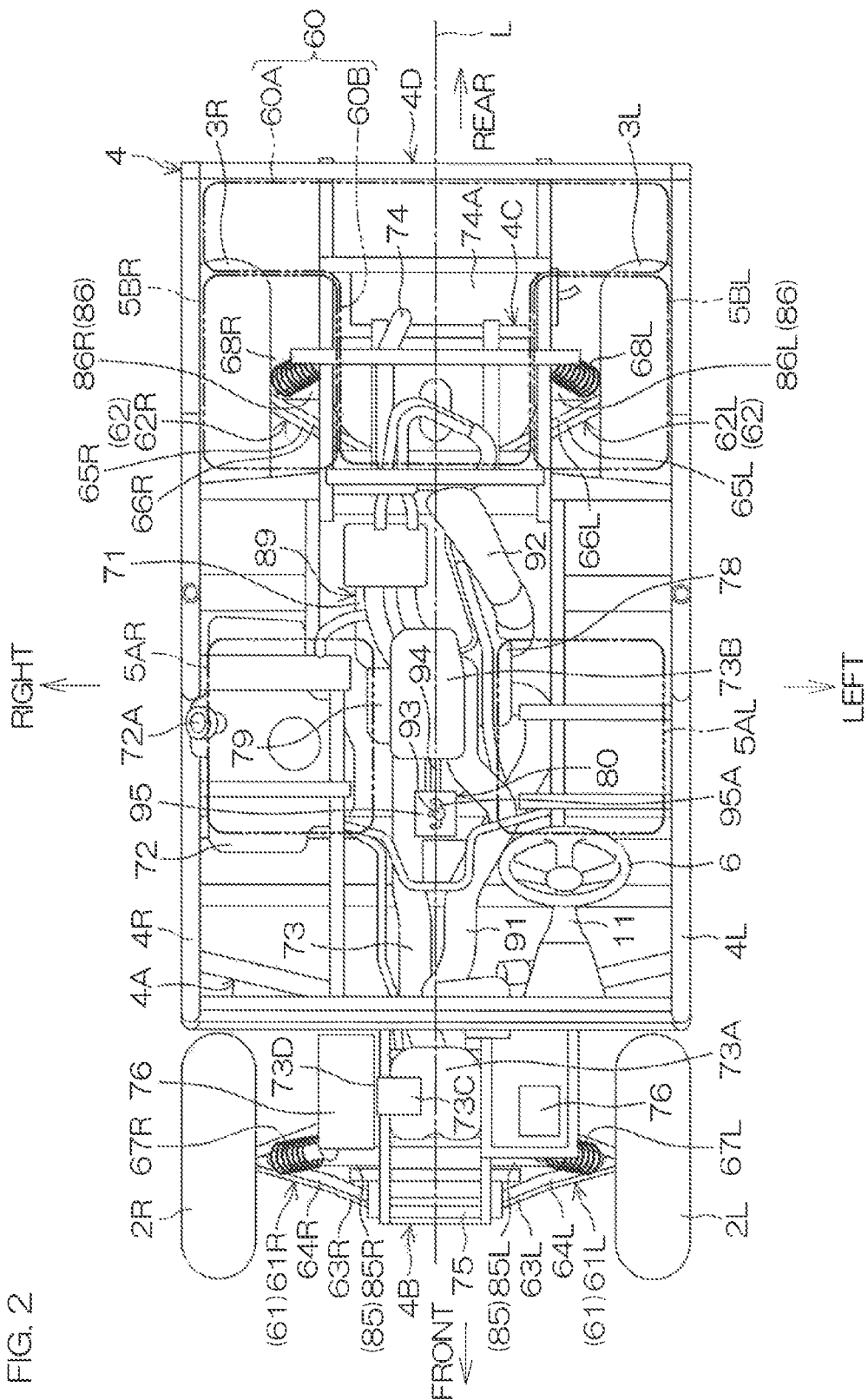
FIG. 2 is a schematic plan view of a vehicle in a state where a roof and a body panel, etc., are removed.

FIG. 2 is a schematic plan view of the vehicle 1 in a state where the roll cage 7, the doors 9, the body panel 10, and the roof 13 are removed.

The vehicle 1 includes a rear deck 60. The rear deck 60 includes a laterally elongated portion 60A located farther rearward than the rear seat 5B, and a projection 60B projecting forward from a center of the laterally elongated portion 60A and located between the left rear seat 5BL and the right rear seat 5BR, and is T-shaped or substantially T-shaped in plan view.

The vehicle 1 includes a pair of right and left front suspensions 61 suspending the pair of right and left front wheels 2 respectively, and a pair of right and left rear suspensions 62 suspending the pair of right and left rear wheels 3 respectively. The pair of right and left front suspensions 61 include a front suspension 61R suspending the right front wheel 2R, and a front suspension 61L suspending the left front wheel 2L. The pair of right and left rear suspensions 62 include a rear suspension 62R suspending the right rear wheel 3R, and a rear suspension 62L suspending the left rear wheel 3L. The frame 4 is supported by the pair of front wheels 2 and the pair of rear wheels 3 via the suspensions 61L, 61R, 62L, and 62R. The suspensions 61L, 61R, 62L, and 62R in the present preferred embodiment are preferably of the double wishbone type.

The front suspension 61L includes a front upper arm 64L and a front lower arm 63L aligned in the up-down direction. The front suspension 61R includes a front upper arm 64R and a front lower arm 63R aligned in the up-down direction. The right and left pair of front lower arms 63R and 63L are an example of front arms according to a preferred embodiment of the present invention. Each of the front lower arms 63L and 63R and the front upper arms 64L and 64R is preferably an A-arm.

A left end of each of the front lower arm 63L and the front upper arm 64L is coupled to a knuckle arm (not shown) of the front wheel 2L. A right end of each of the front lower arm 63R and the front upper arm 64R is coupled to a knuckle arm (not shown) of the front wheel 2R. The front lower arms 63R and 63L and the front upper arms 64R and 64L support the right and left front wheels 2R and 2L. A right end of each of the front lower arm 63L and the front upper arm 64L is mounted to the front frame 4B so as to be swingable up and down. A left end of each of the front lower arm 63R and the front upper arm 64R is mounted to the front frame 4B so as to be swingable up and down.

A lower end of a shock absorber 67L is coupled to a left end portion of the front upper arm 64L, and a lower end of a shock absorber 67R is coupled to a right end portion of the front upper arm 64R. Upper ends of the shock absorbers 67L and 67R are coupled to the front frame 4B.

The rear suspension 62L includes a rear upper arm 66L and a rear lower arm 65L aligned in the up-down direction. The rear suspension 62R includes a rear upper arm 66R and a rear lower arm 65R aligned in the up-down direction. The right and left pair of rear lower arms 65R and 65L are an example of rear arms according to a preferred embodiment of the present invention. Each of the rear lower arms 65L and 65R and the rear upper arms 66L and 66R is preferably an A-arm.

A left end of each of the rear lower arm 65L and the rear upper arm 66L is coupled to a knuckle arm (not shown) of the rear wheel 3L. A right end of each of the rear lower arm 65R and the rear upper arm 66R is coupled to a knuckle arm (not shown) of the rear wheel 3R. The rear lower arms 65R and 65L and the rear upper arms 66R and 66L support the right and left rear wheels 3R and 3L. A right end of the rear lower arm 65L is mounted to the rear frame 4C so as to be swingable up and down. A right end of the rear upper arm 66L is mounted to the frame 4 so as to be swingable up and down. A left end of the rear lower arm 65R is mounted to the rear frame 4C so as to be swingable up and down. A left end of the rear upper arm 66R is mounted to the frame 4 so as to be swingable up and down.

A lower end of a shock absorber 68L is coupled to a left end portion of the rear upper arm 66L, and a lower end of a shock absorber 68R is coupled to a right end portion of the rear upper arm 66R. Upper ends of the shock absorbers 68L and 68R are coupled to the upper frame 4D.

Figure 3:
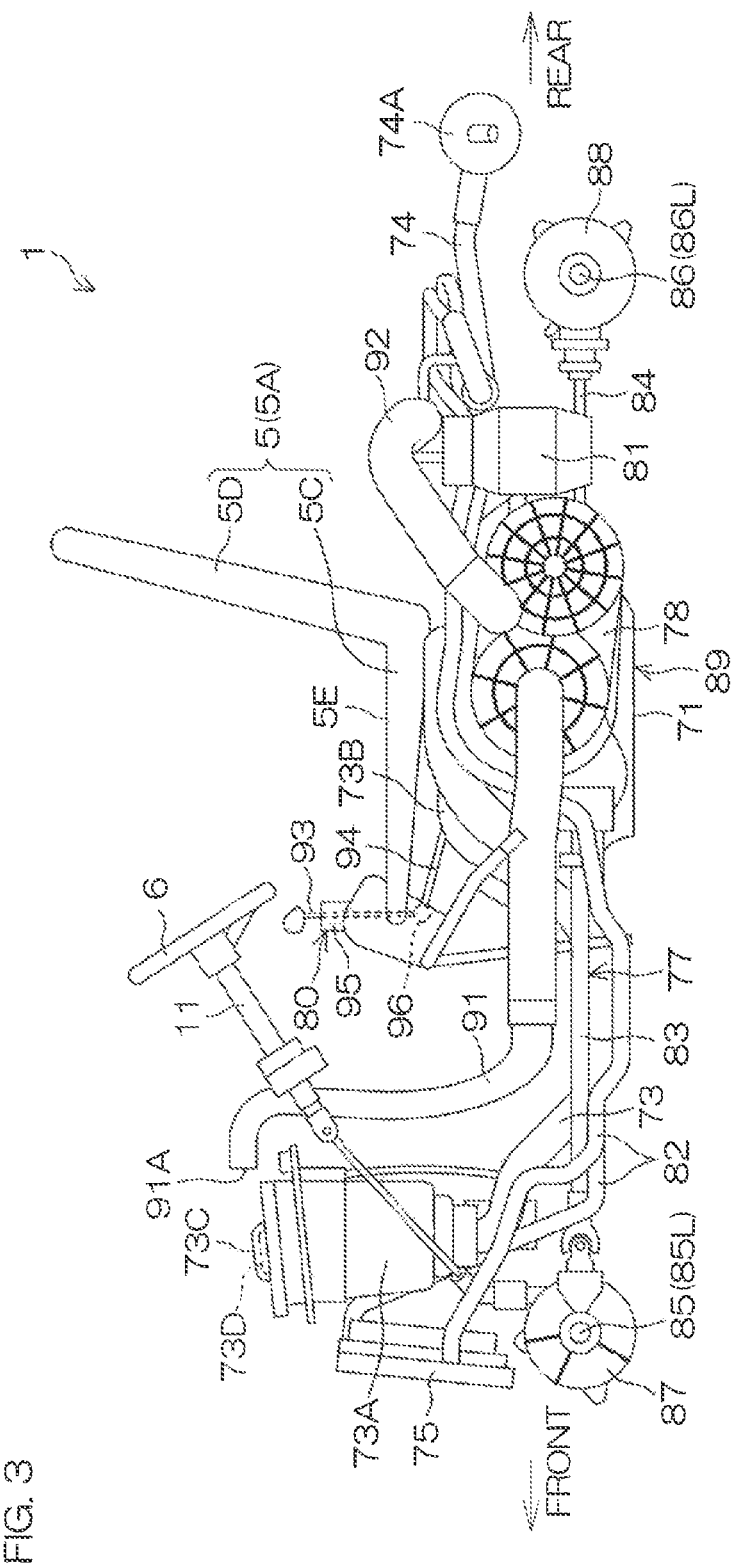
FIG. 3 is a schematic side view of the vehicle in a state where the roof, the body panel, and a frame, etc., are removed.

FIG. 3 is a schematic left side view of the vehicle 1 in a state where the frame 4, the roll cage 7, the doors 9, the body panel 10, the roof 13, etc., are removed. Referring to FIG. 2 and FIG. 3, the vehicle 1 includes an engine 71, a fuel tank 72, an intake passage 73, an exhaust passage 74, a radiator 75, batteries 76, a transmission 77, a continuously variable transmission 78, a shiftable transmission 79, and a shifter 80.

The engine 71 is preferably an internal combustion engine and is, for example, a water-cooled, four-cycle, parallel two-cylinder engine in the present preferred embodiment. The engine 71 is coupled to and supported by the intermediate frame 4A. The engine 71 is located at a center of the vehicle 1 in regard to the right-left direction. Specifically, at least a portion of the engine 71 overlaps with a virtual centerline L passing through the center of the vehicle 1 and extending in the front-rear direction in plan view. At least a front end portion of the engine 71 is located between the two front seats 5A in plan view. The engine 71 is located at a position lower than the seat surfaces 5E of the respective front seats 5A. The engine 71 is, for example, a dry-sump engine, and an oil tank 81 that stores engine oil for the engine 71 is located to the rear of the engine 71.

The fuel tank 72 stores fuel for the engine 71. The fuel for the engine 71 is, for example, gasoline. The fuel tank 72 is located to the right of the engine 71 so as to be aligned with the engine 71 in the right-left direction and is coupled to the intermediate frame 4A. The fuel tank 72 is located at a position lower than the seat surfaces 5E of the respective seats 5A and at least a portion of the fuel tank 72 overlaps with the right front seat 5AR in plan view. A fuel inlet (not shown) and a fuel cap 72A that opens and closes the fuel inlet are provided at a right end portion of an upper surface of the fuel tank 72.

The intake passage 73 extends in the front-rear direction at a position lower than the feet of the occupants seated on the front seats 5. An intake box 73A is provided at a front end portion of the intake passage 73 and an accumulator 73B is provided at a rear end portion of the intake passage 73. The intake box 73A is coupled to the front frame 4B. A projection 73C projects upward from an upper surface of the intake box 73A. An air inlet 73D that takes air into the intake box 73A is provided, for example, in a right surface of the projection 73C. The accumulator 73B is located in front of the engine 71 and is connected to intake ports (not shown) at the respective cylinders of the engine 71 via a throttle body (not shown). Air at a periphery of the intake box 73A is taken into the intake box 73A from the air inlet 73D. The air taken into the intake box 73A is cleaned by passing through a filter (not shown) inside the intake box 73A. The cleaned air continues to flow inside the intake passage 73, arrives at the accumulator 73B, and is supplied to the intake ports at the respective cylinders of the engine 71 via the throttle body.

The exhaust passage 74 extends rearward from exhaust ports (not shown) at the respective cylinders of the engine 71. A muffler 74A is provided at a rear end portion of the exhaust passage 74. The muffler 74A is fixed to the rear frame 4C. Exhaust gas generated in the engine 71 flows through the exhaust passage 74 and is discharged from the muffler 74A.

The radiator 75 is located farther forward than the intake box 73A and is coupled to the front frame 4B. The radiator 75 and the engine 71 are linked via a cooling pipe 82. Cooling water flows through the cooling pipe 82 and is thus circulated between the radiator 75 and the engine 71. The circulated cooling water is cooled when flowing through the radiator 75 and cools the engine 71 when flowing through the engine 71.

The batteries 76 supply electric power to electrical elements (not shown) in the vehicle 1. The batteries 76 are provided, for example, one each at the right and the left of the intake box 73A and are fixed to the front frame 4B.

The transmission 77 includes a front propeller shaft 83, a rear propeller shaft 84, front drive shafts 85, rear drive shafts 86, a front gearing 87, and a rear gearing 88. The front propeller shaft 83 extends forward from the engine 71, and the rear propeller shaft 84 extends rearward from the engine 71. A pair of right and left front drive shafts 85 extend rightward and leftward. Of the pair of front drive shafts 85, a left end of the front drive shaft 85L at the left is linked to the left front wheel 2L and a right end of the front drive shaft 85R at the right is linked to the right front wheel 2R. Similarly, a pair of right and left rear drive shafts 86 extend rightward and leftward. Of the pair of rear drive shafts 86, a left end of the rear drive shaft 86L at the left is linked to the left rear wheel 3L and a right end of the rear drive shaft 86R at the right is linked to the right rear wheel 3R.

The front gearing 87 is coupled to the front frame 4B. The front gearing 87 is supported by the front frame 4B. The front gearing 87 links each of a right end of the front drive shaft 85L and a left end of the front drive shaft 85R to a front end of the front propeller shaft 83. The rear gearing 88 is coupled to the rear frame 4C. The rear gearing 88 is supported by the rear frame 4C. The rear gearing 88 links each of a right end of the rear drive shaft 86L and a left end of the rear drive shaft 86R to a rear end of the rear propeller shaft 84.

The continuously variable transmission 78 is preferably a belt transmission in the present preferred embodiment and is located to a side, and more specifically at the left of the engine 71. The fuel tank 72 located to the right of the engine 71 sandwiches the engine 71 with the continuously variable transmission 78. The shiftable transmission 79 is preferably a gear transmission and is located farther forward than the engine 71. The shiftable transmission 79 is shiftable, for example, to any of three shift stages of high speed, low speed, and reverse. The engine 71, the continuously variable transmission 78, and the shiftable transmission 79 are integral and define a drive unit 89.

An intake duct 91 and an exhaust duct 92 are connected to the continuously variable transmission 78. The intake duct 91 extends in the front-rear direction at a position lower than the feet of the occupants seated on the front seats 5. A front portion of the intake duct 91 is bent upward and a front end portion of the intake duct 91 is bent and extends forward. An air inlet 91A that takes air into the intake duct 91 is provided at a front end of the intake duct 91. The air inlet 91A is at the same or substantially the same height position as the air inlet 73D of the intake box 71A. A rear end portion of the intake duct 91 branches in two and is connected to the continuously variable transmission 78. The exhaust duct 92 extends, for example, rearward and upward from the continuously variable transmission 78. Air taken into the intake duct 91 from the air inlet 91A is guided into the continuously variable transmission 78 by the intake duct 91 and cools an interior of the continuously variable transmission 78. The air inside the continuously variable transmission 78 is discharged through the exhaust duct 92.

The shifter 80 includes an operation lever 93 extending in the up-down direction, a shift rod 94 extending in the forward-rearward direction, and a shift gate 95 holding the operation lever 93. The operation lever 93 is inserted in a groove 95A in the shift gate 95 and is movable forward and rearward along the groove 95A. A lower end of the operation lever 93 and a front end of the shift rod 94 are mutually coupled by a ball joint 96 (see FIG. 3). A rear end of the shift rod 94 is coupled to the shiftable transmission 79. The shift gate 95 is fixed to the intermediate frame 4A. When the driver seated on the left front seat 5AL grips an upper end portion of the operation lever 93 and moves it forward or rearward, a shifting operation force by the driver is input into the shiftable transmission 79 and the shiftable transmission 79 is shifted.

A rotational power of the engine 71 is continuously shifted by the continuously variable transmission 78 and then transmitted to the shiftable transmission 79. The rotational power transmitted to the shiftable transmission 79 is shifted at a shift ratio of a shift stage among high speed, low speed, and reverse by the shiftable transmission 79 and then transmitted to the front propeller shaft 83 and the rear propeller shaft 84. The rotational power transmitted to the front propeller shaft 83 is transmitted to the front gearing 87. The front gearing 87 transmits the rotational power to the front drive shafts 85L and 85R. The rotational power is thus transmitted to the right and left front wheels 2. The rotational power transmitted to the rear propeller shaft 84 is transmitted to the rear gearing 88. The rear gearing 88 transmits the rotational power to the rear drive shafts 86L and 86R. The rotational power is thus transmitted to the right and left rear wheels 3. The front gearing 87 of the present preferred embodiment includes a differential gear and transmits the rotational power from the front propeller shaft 83 to the front drive shafts 85L and 85R while allowing a rotational difference between the front drive shafts 85L and 85R. The rear gearing 88 may or may not include a differential gear.

Figure 4:
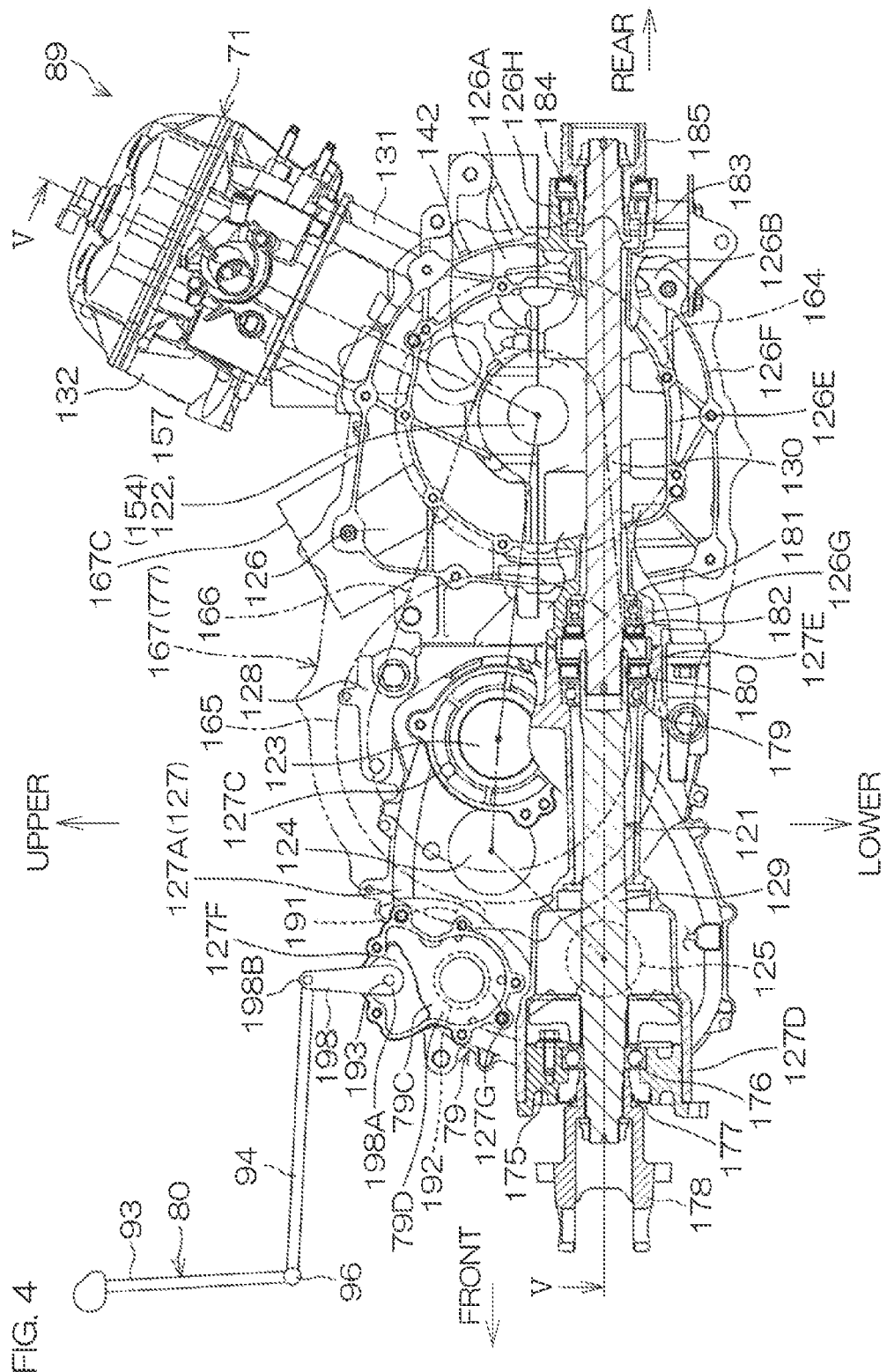
FIG. 4 is a side view of a drive unit included in the vehicle.
Figure 5:
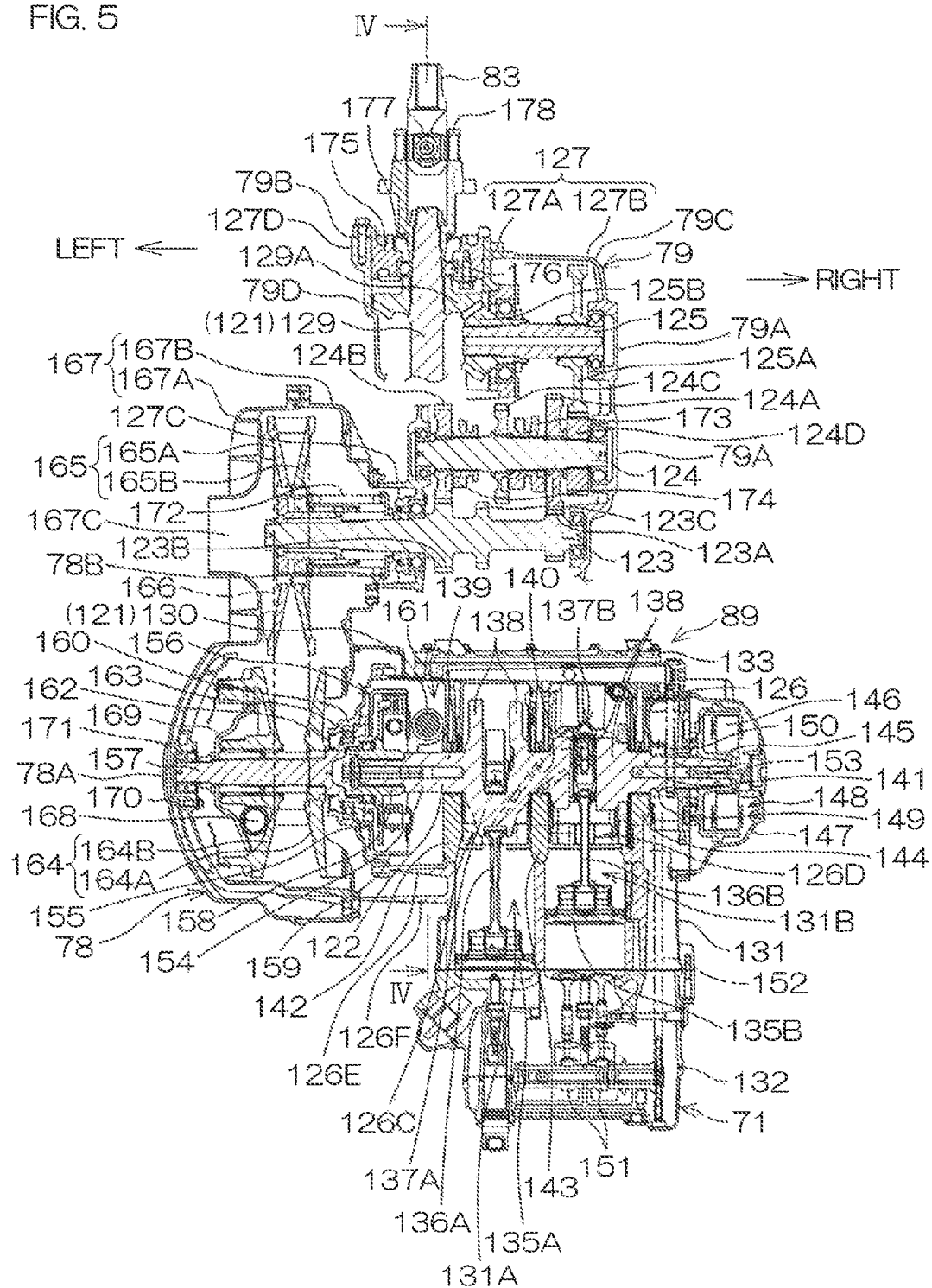
FIG. 5 is a developed sectional view of the drive unit taken along line V-V of FIG. 4.

FIG. 4 is a left side view of the drive unit 89. In FIG. 4, a section passing through an axial center of a propeller shaft 121 (line IV-IV of FIG. 5) is shown to illustrate a structure of the propeller shaft 121 and a peripheral thereof of the drive unit 89. FIG. 5 is a developed sectional view when the drive unit 89 is sectioned along line V-V of FIG. 4. The line V-V is a polygonal line connecting respective axial centers of a crankshaft 122, a secondary shaft 123, a transmission shaft 124, and an output shaft 125, to be described below, in that order.

The engine 71 includes the crankshaft 122. The crankshaft 122 is an example of an output shaft and a drive shaft according to a preferred embodiment of the present invention. The crankshaft 122 is oriented in the right-left direction. The continuously variable transmission 78 includes the secondary shaft 123. The secondary shaft 123 is an example of a first output shaft according to a preferred embodiment of the present invention. The shiftable transmission 79 includes the transmission shaft 124 and the output shaft 125. The transmission shaft 124 is an example of a second input shaft according to a preferred embodiment of the present invention, and the output shaft 125 is an example of a second output shaft according to a preferred embodiment of the present invention. The secondary shaft 123, the transmission shaft 124, and the output shaft 125 extend parallel or substantially parallel to the crankshaft 122. The secondary shaft 123 is located farther forward than the crankshaft 122. The transmission shaft 124 is located farther forward than the secondary shaft 123. The output shaft 125 is located farther forward than the transmission shaft 124.

The engine 71 includes a crankcase 126 housing the crankshaft 122. The shiftable transmission 79 includes a transmission case 127, housing a right portion of the secondary shaft 123, the transmission shaft 124, and the output shaft 125. The transmission case 127 is located in front of the crankcase 126, and the crankcase 126 and the transmission case 127 are mutually linked via an adapter 128.

The propeller shaft 121 extends in the front-rear direction. The propeller shaft 121 is located below the crankshaft 122, the secondary shaft 123, and the transmission shaft 124 and is perpendicular or substantially perpendicular to the shafts 122, 123, and 124 in plan view. A central axis of the propeller shaft 121 and a central axis of the output shaft 125 are located at the same height position. The propeller shaft 121 includes a front shaft 129 that penetrates forward and rearward through the transmission case 127, and a rear shaft 130 that penetrates forward and rearward through the crankcase 126, and the front shaft 129 and the rear shaft 130 are mutually linked.

The crankcase 126 is divisible above and below into an upper crankcase 126A and a lower crankcase 126B at a horizontal boundary plane passing through the axial center of the crankshaft 122. A cylinder block 131 is joined to an upper portion of the upper crankcase 126A, and a cylinder head 132 is joined to an upper portion of the cylinder block 131. An oil pan 133 is joined to a lower portion of the lower crankcase 126B.

Two cylinder bores 131A and 131B are provided at the right and left in the cylinder block 131. Pistons 135A and 135B are respectively inserted in interiors of the cylinder bores 131A and 131B. The pistons 135A and 135B are linked to the crankshaft 122 via connecting rods 136A and 136B, respectively.

The crankshaft 122 includes a pair of right and left crankpins 137B and 137A, crank webs 138, and crank journals 139, 140, and 141. The crankpins 137A and 137B are linked to the connecting rods 136A and 136B, respectively. The plurality of crank webs 138 are linked so as to sandwich the crankpins 137A and 137B respectively. The crank journals 139, 140, and 141 are respectively linked to the crank webs 138.

Two crank chambers 126D and 126C aligned in the right-left direction are provided inside the crankcase 126. The crankcase 126 includes three supporting wall portions 144, 143, and 142 aligned in the right-left direction. The left crank chamber 126C is provided between the left supporting wall portion 142 and the middle supporting wall portion 143. The right crank chamber 126D is provided between the middle supporting wall portion 143 and the right supporting wall portion 144.

The left crankpin 137A and the pair of crank webs 138 that sandwich it are housed in the left crank chamber 126C. The right crankpin 137B and the pair of crank webs 138 that sandwich it are housed in the right crank chamber 126D. The left crank journal 139 is rotatably supported by the left supporting wall portion 142. The middle crank journal 140 is rotatably supported by the middle supporting wall portion 143. The right crank journal 141 is rotatably supported by the right supporting wall portion 144.

The crankshaft 122 further includes a right extension 145 extending outward to the right from the right supporting wall portion 144 of the crankcase 126. A generator 146 is mounted to the right extension 145. A generator cover 147 is mounted to a right side surface of the crankcase 126. A generator chamber 148 housing the generator 146, is provided between the crankcase 126 and the generator cover 147. A gear 149 and a gear 150 are provided at the right extension 145 between the supporting wall portion 144 and the generator 146. The gear 149 drives a cam 151 provided on the cylinder head 132 via a cam chain 152. The gear 150 drives a pump unit (not shown) via a pump chain 153.

The crankshaft 122 further includes a left extension 154 extending outward to the left from the supporting wall portion 142 of the crankcase 126. The drive unit 89 further includes a clutch structure 155. The clutch structure 155 includes a centrifugal clutch 156. The centrifugal clutch 156 is located at a tip portion of the left extension 154. The centrifugal clutch 156 is located coaxially to the crankshaft 122. A gap that receives the rear shaft 130 of the propeller shaft 121 is provided between the supporting wall portion 142 and the centrifugal clutch 156.

The continuously variable transmission 78 includes a primary shaft 157. The primary shaft 157 is located to the left of the left extension 154. The primary shaft 157 is an example of an input shaft and a first input shaft according to a preferred embodiment of the present invention. The left extension 154 and the primary shaft 157 are linked coaxially via the centrifugal clutch 156. The centrifugal clutch 156 includes a clutch input shaft 158 and a clutch output shaft 159. The clutch input shaft 158 is mounted to the left extension 154, and the clutch output shaft 159 is mounted to the primary shaft 157. Due to a centrifugal force accompanying rotation of the crankshaft 122, an outer circumferential surface of the clutch input shaft 158 is pressed against an inner circumferential surface of the clutch output shaft 159. A rotational power of the crankshaft 122 is thus input into the primary shaft 157.

A clutch cover 160 is mounted to a left side surface of the crankcase 126. An annular edge portion 126E extending to the left and surrounding the left extension 154 is provided at the left side surface of the crankcase 126. Due to the clutch cover 160 being joined to the edge portion 126E, a clutch chamber 161 is defined by the clutch cover 160 and the left side surface of the crankcase 126. The clutch structure 155 is housed in the clutch chamber 161. A left end portion of the clutch output shaft 159 penetrates through the clutch cover 160 and is linked to a right end portion of the primary shaft 157. A gap between the left end portion of the clutch output shaft 159 and the clutch cover 160 is sealed by a seal 162. The clutch output shaft 159 is rotatably supported by the clutch cover 160 via a bearing 163.

The continuously variable transmission 78 includes a drive pulley 164, a driven pulley 165, and a belt 166. The drive pulley 164 is mounted to the primary shaft 157. The driven pulley 165 is located farther forward than the drive pulley 164 and is mounted to a left end portion of the secondary shaft 123. The belt 166 is preferably made of rubber or metal, for example, and is wound around the drive pulley 164 and the driven pulley 165.

The continuously variable transmission 78 includes a CVT case 167. The CVT case 167 houses the primary shaft 157, the drive pulley 164, the driven pulley 165, the belt 166, and a left portion of the secondary shaft 123. The CVT case 167 is separate from the crankcase 126 and the transmission case 127 and is located to the left of the crankcase 126 and the transmission case 127. The CVT case 167 is divisible to the right and left into a right CVT case 167B and a left CVT case 167A. An annular edge portion 126F extending to the left and surrounding the edge portion 126E which defines the clutch chamber 161 is provided at the left side surface of the crankcase 126. A left end portion of the edge portion 126F is joined to a rear portion of the right CVT case 167B.

A connection port 167C to which the intake duct 91 (see FIG. 2) is connected, is provided in a left side surface of a front portion of the left CVT case 167A. Another connection port 167C is provided in an upper surface of the edge portion 126F. A connection port (not shown) to which the exhaust duct 92 (see FIG. 2) is connected, is provided in an upper surface of a rear portion of the left CVT case 167A. A left side surface of the rear portion of the left CVT case 167A bulges to the left and a left end of the left side surface defines a left end 78A of the continuously variable transmission 78.

The drive pulley 164 includes a fixed sheave 164A fixed to the primary shaft 157, and a movable sheave 164B provided on the primary shaft 157 so as to be movable to the right and left. A weight 168 is located between the movable sheave 164B and a cam plate 169 fixed to the primary shaft 157. The weight 168 moves the movable sheave 164B to the right and left due to a centrifugal force accompanying rotation of the primary shaft 157. A left end portion of the primary shaft 157 is supported by a cylindrical housing 170 provided inside the left CVT case 167A via a bearing 171.

The driven pulley 165 includes a fixed sheave 165A fixed to the left end portion of the secondary shaft 123, and a movable sheave 165B provided on the secondary shaft 123 so as to be movable to the right and left. The movable sheave 165B is urged in a direction (leftward) toward the fixed sheave 165A by a coil spring 172.

With the continuously variable transmission 78, a distance between the fixed sheave 164A and the movable sheave 164B, and a distance between the fixed sheave 165A and the movable sheave 165B change. The rotational power of the primary shaft 157 is thus output and continuously shifted from the secondary shaft 123 to the shiftable transmission 79.

The transmission case 127 of the shiftable transmission 79 is divisible to the right and left into a right transmission case 127B and a left transmission case 127A. An edge portion 127C extending to the left and surrounding the secondary shaft 123, is provided on a left side surface of a rear portion of the left transmission case 127A. A left end portion of the edge portion 127C is joined to a right side surface of a front portion of the right CVT case 167B. A right end of the right side surface of the front portion of the right CVT case 167B defines a right end 78B of the continuously variable transmission 78. A right side surface of a portion of a right wall of the right transmission case 127B that faces the transmission shaft 124 and the output shaft 125 from the right defines a right end 79A of the shiftable transmission 79.

A low drive gear 123A, a high drive gear 123B, and a reverse drive gear 123C are provided integrally on a right portion of the secondary shaft 123. The low drive gear 123A, the reverse drive gear 123C, and the high drive gear 123B are aligned in that order from the right. A low driven gear 124A, a high driven gear 124B, and a reverse driven gear 124C are installed on the transmission shaft 124 so as to be relatively rotatable to the transmission shaft 124. The low driven gear 124A, the reverse driven gear 124C, and the high driven gear 125B are aligned in that order from the right. The low drive gear 123A and the low driven gear 124A are engaged with each other. The high drive gear 123B and the high driven gear 124B are engaged with each other. The reverse drive gear 123C and the reverse driven gear 124C are engaged with a gear (not shown) provided on a countershaft (not shown). The reverse driven gear 124C thus rotates in reverse to the low driven gear 124A and the high driven gear 124B.

Dog clutches 173 and 174 are installed on the transmission shaft 124 so as to be movable relatively to the right and left. The dog clutch 173 is located between the low driven gear 124A and the reverse driven gear 124C and is splined to the transmission shaft 124. The dog clutch 174 is located between the high driven gear 124B and the reverse driven gear 124C and is splined to the transmission shaft 124.

A drive gear 124D is splined to a right end portion of the transmission shaft 124. A driven gear 125A engaged with the drive gear 124D is splined to a right end portion of the output shaft 125. A bevel gear 125B is splined to a left end portion of the output shaft 125. A bevel gear 129A engaged with the bevel gear 125B is splined to the front shaft 129 of the propeller shaft 121.

In a state in which the dog clutch 173 is engaged with the low driven gear 124A, the transmission shaft 124 rotates together with the low driven gear 124A. A rotational power of the transmission shaft 124 is shifted to a low speed shift stage and transmitted to the output shaft 125. In a state in which the dog clutch 174 is engaged with the high driven gear 124B, the transmission shaft 124 rotates together with the high driven gear 124B. The rotational power of the transmission shaft 124 is shifted to a high speed shift stage and transmitted to the output shaft 125. In a state in which the dog clutch 173 is engaged with the reverse driven gear 124C, the transmission shaft 124 rotates together with the reverse driven gear 124C. The rotational power of the transmission shaft 124 is shifted to a reverse shift stage and transmitted to the output shaft 125. The rotational power of the output shaft 125 is transmitted to the front shaft 129 of the propeller shaft 121 by the bevel gear 125B and the bevel gear 129A.

The shiftable transmission 79 thus inputs the rotational power of the secondary shaft 123 into the transmission shaft 124 and shifts to any shift stage among high speed, low speed, and reverse. The shiftable transmission 79 then outputs the rotational power input into the transmission shaft 124 to the output shaft 125 and transmits the rotational power from the output shaft 125 to the front shaft 129.

A front end portion of the front shaft 129 penetrates forward and rearward through the transmission case 127 and projects forward from the transmission case 127. An annular shaft support 127D that projects forward is provided at a front wall of the left transmission case 127A. A left end of the shaft support 127D is located farther leftward than a left end of the edge portion 127C connected to the left transmission case 127A and defines a left end 79B of the shiftable transmission 79. An annular cap 175 is fitted inside the shaft support 127D. The front end portion of the front shaft 129 is supported by the cap 175 via a bearing 176. A gap between the front end portion of the front shaft 129 and the cap 175 is sealed by a seal 177. The front end portion of the front shaft 129 is linked to a rear end portion of the front propeller shaft 83 via a linkage 178. The front shaft 129 and the linkage 178 may be portions of the front propeller shaft 83.

Referring to FIG. 4, a rear end portion of the front shaft 129 projects rearward from the transmission case 127. An annular shaft support 127E is provided at a rear wall of the transmission case 127. The rear end portion of the front shaft 129 is supported by the shaft support 127E via a bearing 179. A gap between the rear end portion of the front shaft 129 and the shaft support 127E is sealed by a seal 180.

A front end portion of the rear shaft 130 projects forward from the crankcase 126. An annular shaft support 126G is provided at a front wall of the crankcase 126. The front end portion of the rear shaft 130 is supported by the shaft support 126G via a bearing 181. A gap between the front end portion of the rear shaft 130 and the shaft support 126G is sealed by a seal 182. The front end portion of the rear shaft 130 is splined to the rear end portion of the front shaft 129. The front shaft 129 and the rear shaft 130 are thus linked to define the propeller shaft 121.

A rear end portion of the rear shaft 130 penetrates forward and rearward through the crankcase 126 and projects rearward from the crankcase 126. An annular shaft support 126H that projects rearward is provided at a rear wall of the crankcase 126. The rear end portion of the rear shaft 130 is supported by the shaft support 126H via a bearing 183. A gap between the rear end portion of the rear shaft 130 and the shaft support 126H is sealed by a seal 184. The rear end portion of the rear shaft 130 is linked to a front end portion of the rear propeller shaft 84 (see FIG. 3) via a linkage 185. The rear shaft 130 and the linkage 185 may be portions of the rear propeller shaft 84.

The rotational power transmitted from the output shaft 125 to the front shaft 129 is transmitted to the front propeller shaft 83 and the rear propeller shaft 84 of the transmission 77, and transmitted to the front wheel 2 and the rear wheel 3 as mentioned above.

Figure 6A:
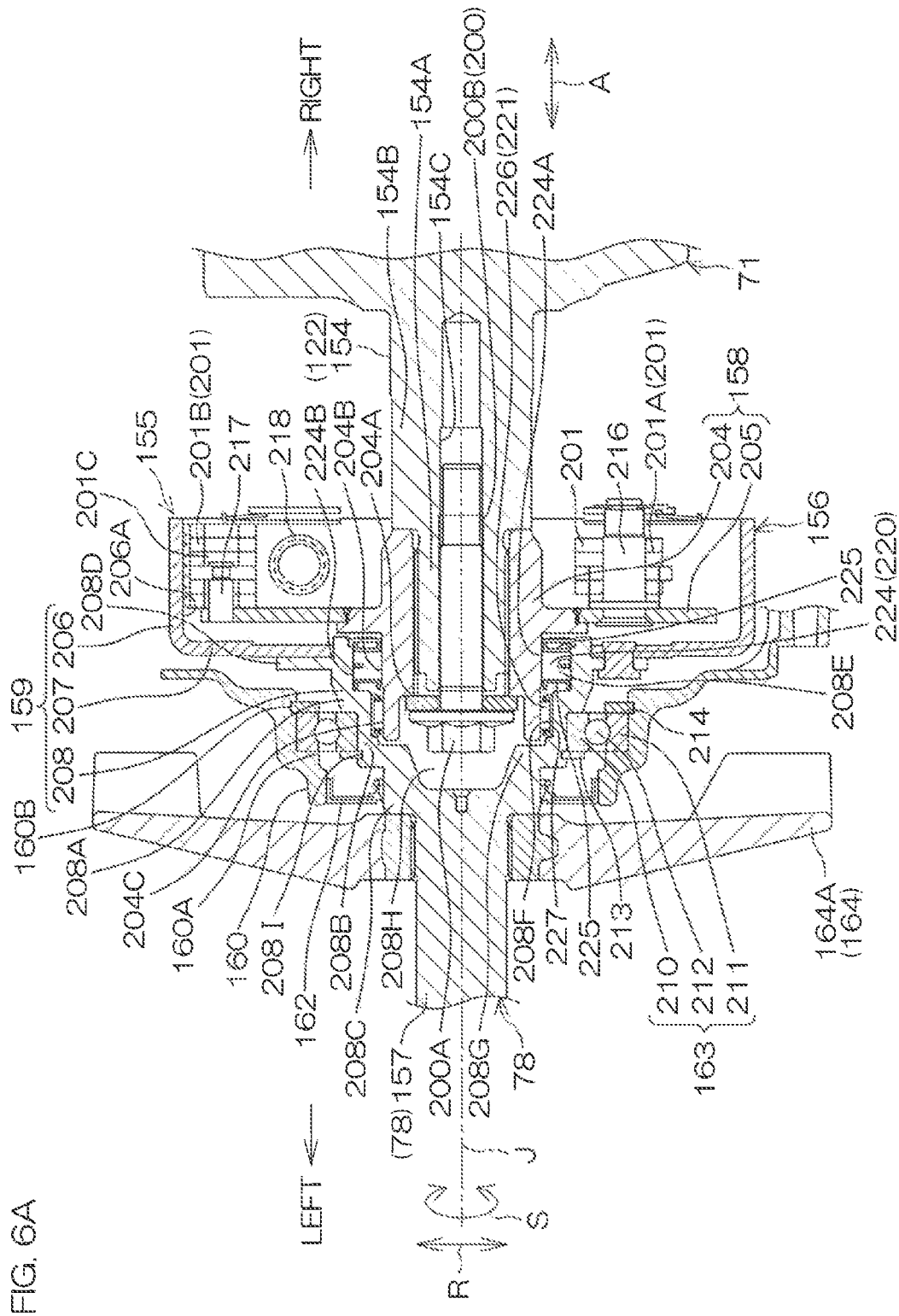
FIG. 6A is an enlarged view extracting a clutch structure and a periphery thereof in FIG. 5.
Figure 6B:
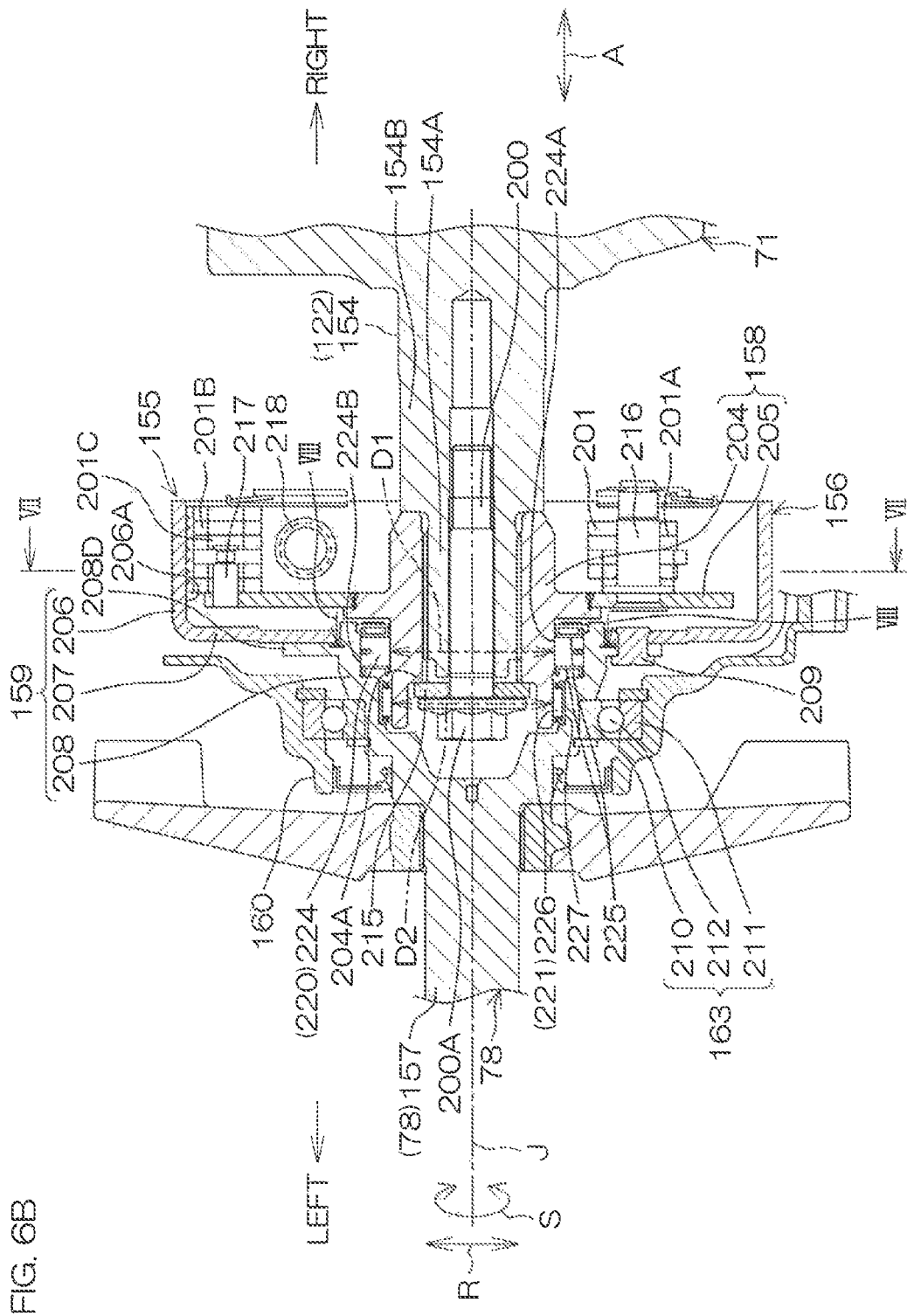
FIG. 6B is an enlarged view extracting a clutch structure and a periphery thereof in FIG. 5.

FIGS. 6A and 6B are enlarged views extracting the clutch structure 155 and a periphery thereof in FIG. 5. The reference characters described below are illustrated at least in one of either of FIGS. 6A and 6B. The centrifugal clutch 156 of the clutch structure 155 includes the clutch input shaft 158, clutch output shaft 159, bearing 163, a bolt 200, and weight members 201. The bolt 200 is an example of a connector according to a preferred embodiment of the present invention. The bearing 163 is an example of a second bearing according to a preferred embodiment of the present invention.

The clutch input shaft 158 includes an input shaft portion 204 and a first flange portion 205. The input shaft portion 204 preferably has a cylindrical or substantially cylindrical shape including a center J extending in the right-left direction. An annular step 204A extending in a circumferential direction S based on the center J, is provided at a left side position of an inner circumferential surface of the input shaft portion 204. A portion of the inner circumferential surface of the input shaft portion 204 farther leftward than the step 204A is larger in diameter than a portion of the inner circumferential surface of the input shaft portion 204 farther rightward than the step 204A. A left end portion 154A of the left extension 154 of the crankshaft 122 is inserted into a portion of an internal space of the input shaft portion 204 farther rightward than the step 204A. In this state, the input shaft portion 204 is splined to the left end portion 154A of the left extension 154. The left extension 154 includes a large diameter portion 154B larger in outer diameter than the left end portion 154A and provided farther rightward than the left end portion 154A. A threaded hole 154C extending rightward from a left end surface of the left end portion 154A is provided in the left extension 154.

The first flange portion 205 preferably has a circular or substantially circular annular shape having a thickness in the right-left direction. The first flange portion 205 is provided at an intermediate portion of an outer circumferential surface of the input shaft portion 204. In regard to a radial direction R based on the center J, the first flange portion 205 extends outward from the outer circumferential surface of the input shaft portion 204. A portion of the outer circumferential surface of the input shaft portion 204 farther leftward than the first flange portion 205 includes a first outer circumferential surface 204B adjacent to the first flange portion 205, and a second outer circumferential surface 204C farther leftward than the first outer circumferential surface 204B. The second outer circumferential surface 204C is adjacent to the first outer circumferential surface 204B. An outer diameter of the first outer circumferential surface 204B and an outer diameter of the second outer circumferential surface 204C are the same or substantially the same. In the present preferred embodiment, the outer diameter of the first outer circumferential surface 204B is slightly larger than the outer diameter of the second outer circumferential surface 204C.

The clutch output shaft 159 is located coaxially with the clutch input shaft 158. The clutch output shaft 159 includes a cylindrical portion 206, a second flange portion 207, and an output shaft portion 208. The cylindrical portion 206 preferably has a cylindrical or substantially cylindrical shape including a center corresponding to the center J. An inner diameter of the cylindrical portion 206 is larger than an outer diameter of the first flange portion 205. A left portion of the cylindrical portion 206 overlaps with the first flange portion 205 when viewed from the radial direction R. That is, the cylindrical portion 206 surrounds the first flange portion 205 in the circumferential direction S. The second flange portion 207 preferably has a circular or substantially circular annular shape including a right-left aligned plate thickness direction. The second flange portion 207 extends inward in the radial direction R from a left end of the cylindrical portion 206.

The output shaft portion 208 preferably has a cylindrical or substantially cylindrical shape including a center corresponding to the center J. A first step 208A, a second step 208B, and a third step 208C that are annular shaped and extend in the circumferential direction S are provided in that order from the right at an outer circumferential surface of the output shaft portion 208. An outer diameter of the first step 208A is larger than an outer diameter of the second step 208B. The outer diameter of the second step 208B is larger than an outer diameter of the third step 208C. An annular coupled portion 208D is provided at an outer circumferential surface of the first step 208A. The coupled portion 208D projects outward in the radial direction R from the outer circumferential surface of the first step 208A. The coupled portion 208D is adjacent to the second flange portion 207 from the left. The coupled portion 208D and the second flange portion 207 are coupled by a rivet, bolt, or other connector 209 (see FIG. 6B). The coupled portion 208D and the second flange portion 207 may be integral. When viewed from the radial direction R, at least a portion of the third step 208C overlaps with a left end portion of the clutch cover 160. The third step 208C is surrounded by the left end portion of the clutch cover 160. The seal 162 is located between the third step 208C and the left end portion of the clutch cover 160.

An inner circumferential surface of the output shaft portion 208 includes a first inner circumferential surface 208E and a second inner circumferential surface 208F. The first inner circumferential surface 208E is larger in diameter than the second inner circumferential surface 208F and is located farther rightward than the second inner circumferential surface 208F. When viewed from the radial direction R, at least a portion of the first inner circumferential surface 208E overlaps with the first outer circumferential surface 204B of the input shaft portion 204. The first inner circumferential surface 208E surrounds the first outer circumferential surface 204B. When viewed from the radial direction R, at least a portion of the second inner circumferential surface 208F overlaps with the second outer circumferential surface 204C of the input shaft portion 204. The second inner circumferential surface 208F surrounds the second outer circumferential surface 204C. An annular step 208G extending in the circumferential direction S is provided at an inner circumferential surface of the output shaft portion 208. The step 208G projects inward in the radial direction R from a left end of the second inner circumferential surface 208F. A right end surface of the step 208G faces a left end surface of the input shaft portion 204 across a gap. A recess 208H surrounded by the step 208G and recessed to the left is provided inside the output shaft portion 208. The recess 208H preferably has a truncated conical shape that is tapered toward the left. The right end portion of the primary shaft 157 is linked to a left end portion of the output shaft portion 208. A right end surface of the primary shaft 157 defines a bottom of the recess 208H. Although in the present preferred embodiment the primary shaft 157 and the output shaft portion 208 are integral, these may be separate elements instead.

The bearing 163 is annular. The bearing 163 is, for example, a ball bearing and includes an inner wheel 210, an outer wheel 211, and a plurality of rolling elements 212. An inner circumferential surface of the inner wall 210 contacts an outer circumferential surface of the second step 208B of the output shaft portion 208. An outer circumferential surface of the outer wheel 211 contacts an inner circumferential surface of the clutch cover 160.

An annular groove 208I extending in the circumferential direction S is located farther leftward than the inner wheel 210 in the outer circumferential surface of the second step 208B. An inner circumferential portion of a ring-shaped position setting member 213 is fitted in the groove 208I. The inner wheel 210 is sandwiched between the position setting member 213 and the first step 208A of the output shaft portion 208. The inner wheel 210 is thus set in position in the right-left direction, that is, an axial direction A of the clutch input shaft 158.

An annular step 160A extending in the circumferential direction S, and an annular groove 160B extending in the circumferential direction S, are provided at the inner circumferential surface of the clutch cover 160. The step 160A is located farther leftward than the outer wheel 211. The groove 160B is located farther rightward than the outer wheel 211. An outer circumferential portion of a ring-shaped position setting member 214 is fitted in the groove 160B. The outer ring 211 is sandwiched between the step 160A and the position setting member 214. The outer wheel 211 is thus set in position in the right-left direction.

The rolling elements 212 are balls and are located between the inner wheel 210 and the outer wheel 211. The bearing 163 may be a roller bearing, and in this case, the rolling elements 212 are rollers. The bearing 163 surrounds the output shaft portion 208 and rotatably supports the clutch output shaft 159.

The bolt 200 is installed in the threaded hole 154C of the left extension 154 of the crankshaft 122. Most of the bolt 200 is located inside the input shaft portion 204. A left end portion of a head 200A of the bolt 200 protrudes to the left from inside the input shaft portion 204 and is located in the recess 208H inside the output shaft portion 208. The head 200A faces the step 204A of the inner circumferential surface of the input shaft portion 204 from the left. A left end surface of the large diameter portion 154B of the left extension 154 contacts a right end surface of the input shaft portion 204. The input shaft portion 204 is thus fixed to the left extension 154 by being sandwiched between the head 200A and the left extension 154. The head 200A may contact the step 204A directly or a washer 215 (see FIG. 6B) may be interposed between the head 200A and the step 204A.

In the clutch structure 155, the clutch input shaft 158 is fixed to the crankshaft 122 by the bolt 200. In this case, the clutch output shaft 159, the clutch cover 160, and the primary shaft 157 are attachable and detachable integrally during maintenance of the drive unit 89. When a worker removes the clutch output shaft 159, the clutch cover 160, and the primary shaft 157, the head 200A of the bolt 200 is exposed. The worker is able to remove the clutch input shaft 158 from the crankshaft 122 by loosening the bolt 200.

FIG. 7 is a sectional view taken along line VII-VII of FIG. 6B. In relation to the weight members 201, support shafts 216 and position setting pins 217 are provided at an outer circumferential portion of the first flange portion 205 of the clutch input shaft 158. The support shafts 216 and the position setting pins 217 project to the right from the first flange portion 205. A plurality of support shafts 216 are aligned at equal or substantially equal intervals in the circumferential direction S. Position setting pins 217 are provided one each at positions shifted in the circumferential direction S with respect to the support shafts 216. The plurality of weight members 201 are provided in correspondence to the number of pairs (four pairs here) of the support shaft 216 and position setting pin 217. Each weight member 201 includes a base portion 201A, and a tip portion 201B separated in the circumferential direction S from the base portion 201A. The base portion 201A is linked to the corresponding support shaft 216. The weight member 201 is thus supported by the first flange portion 205. In this state, the weight member 201 is movable in the radial direction R such that the tip portion 201B swings around the support shaft 216. A slot 201C which is elongated in the radial direction R, is provided, for example, in the tip portion 201B. The corresponding position setting pin 217 is fitted in the slot 201C. In a range (of, for example, approximately 1 mm) in which the position setting pin 217 is able to move inside the slot 201C, the weight member 201 is movable in the radial direction R. The centrifugal clutch 156 includes urging members 218 connecting the weight members 201 and the clutch input shaft 158. The urging members 218 urge the weight members 201 inward in the radial direction R.

In the centrifugal clutch 156, the clutch input shaft 158 rotates integrally with the crankshaft 122. When a rotational frequency of the clutch input shaft 158 exceeds a predetermined value, the centrifugal force exceeds an urging force of the urging members 218. The weight members 201 are thus moved outward in the radial direction R by the centrifugal force as indicated by the alternate long and two short dashed lines and frictionally contact an inner circumferential surface 206A of the cylindrical portion 206 of the clutch output shaft 159. Then, the centrifugal clutch 156 then becomes ON (connected) and the weight members 201 transmit the rotational power from the clutch input shaft 158 to the clutch output shaft 159. The clutch input shaft 158 and the clutch output shaft 159 thus rotate at an equal speed.

On the other hand, when the rotational frequency of the clutch input shaft 158 becomes not more than the predetermined value, the centrifugal force falls below the urging force of the urging members 218. The weight members 201 are thus separated inward in the radial direction R from the inner circumferential surface 206A of the cylindrical portion 206 as indicated by the solid lines. The centrifugal clutch 156 then becomes OFF (disconnected) and the weight members 201 disconnect the transmission of the rotational power from the clutch input shaft 158 to the clutch output shaft 159.

Referring to FIG. 6A, the clutch structure 155 further includes an annular one-way clutch 220 and an annular bearing 221. The one-way clutch 220 of the present preferred embodiment is a cam clutch and includes a plurality of cams 224 and holders 225 that hold the cams 224.

FIG. 8 is a sectional view taken along line VIII-VIII of FIG. 6B. FIG. 9 is an enlarged view extracting a portion of FIG. 8. The plurality of cams 224 are located between the first outer circumferential surface 204B of the input shaft portion 204 and the first inner circumferential surface 208E of the output shaft portion 208 and are aligned annularly along the circumferential direction S. Each cam 224 includes an arcuate surface 224A bulging inward in the radial direction R, and a cam surface 224B projecting outward in the radial direction R. The arcuate surface 224A contacts the first outer circumferential surface 204B. The cam surface 224B contacts the first inner circumferential surface 208E. The cam surface 224B includes a curved tip portion 224C and flat portions 224D and 224E located so as to sandwich the tip portion 224C. The flat portions 224D and 224E are respectively connected to the arcuate surface 224A. A diameter of a virtual inscribed circle contacting the arcuate surfaces 224A of all cams 224 is an inner diameter D1 of the one-way clutch 220.

The holders 225 are annular. A pair of right and left holders 225 are located so as to sandwich the cams 224 (see FIG. 6A).

When the centrifugal clutch 156 is in the OFF state during idling of the engine 71, the tip portions 224C of the cam surfaces 224 contact the first inner circumferential surface 208E as shown in FIG. 9. At this time, the one-way clutch 220 is in an OFF (disconnected) state and all cams 224 rotate idly. In this state, rotational power is not transmitted between the clutch input shaft 158 and the clutch output shaft 159 via the cams 224.

When the centrifugal clutch 156 becomes ON due to the rotational frequency of the clutch input shaft 158 exceeding the predetermined value, the clutch input shaft 158 and the clutch output shaft 159 rotate at an equal speed as mentioned above. In this state, the one-way clutch 220 continues to be in the OFF state.

When the centrifugal clutch 156 becomes OFF and the rotational frequency of the clutch input shaft 158 falls below the rotational frequency of the clutch output shaft 159, all cams 224 become displaced in unison as shown in FIG. 10. With the displaced cams 224, the flat portions 224D of the cam surfaces 224B are in surface contact with the first inner circumferential surface 208E of the output shaft portion 208. The one-way clutch 220 is thus actuated, becomes ON (connected), and links the input shaft portion 204 and the output shaft portion 208. The rotational power of the output shaft portion 208 is thus transmitted to the input shaft portion 204 and the crankshaft 122 via the cams 224 and the front wheels 2 and the rear wheels 3 thus become forcibly linked with the engine 71. Engine braking thus occurs.

Referring to FIG. 6A, the bearing 221 is an example of a first bearing according to a preferred embodiment of the present invention. The bearing 221 of the present preferred embodiment is a needle bearing and includes a plurality of needles 226 and a holder 227 that holds the needles 226. The plurality of needles 226 are located annularly and surround the input shaft portion 204. The needles 226 contact the second outer circumferential surface 204C of the input shaft portion 204. The holder 227 preferably has an annular shape that surrounds the plurality of needles 226. An outer circumferential surface of the holder 227 contacts the second inner circumferential surface 208F of the output shaft portion 208. The bearing 221 thus located between the input shaft portion 204 and the output shaft portion 208, supports the input shaft portion 204 and the output shaft portion 208 so as to enable relative rotation. A diameter of a virtual inscribed circle contacting outer circumferential surfaces of all needles 226 corresponds to an inner diameter D2 of the bearing 221 (see FIG. 6B). The inner diameter D2 is the same or substantially the same as the inner diameter D1 of the one-way clutch 220 (see FIG. 6B).

The bearing 221 is located adjacent to the left of the one-way clutch 220. That is, the one-way clutch 220 and the bearing 221 are located adjacent to each other in the right-left direction. The bearing 221 is located between the one-way clutch 220 and the bearing 163 in the right-left direction. The bearing 163, the bearing 221, and the one-way clutch 220 are aligned in that order from one side (the left side here) in the axial direction A. At least a portion of the bearing 221 (a left portion of the bearing 221 in the present preferred embodiment) overlaps with the bearing 163 when viewed from the radial direction R. The bearing 221 is located in the same direction (to the left here) with respect to the one-way clutch 220 as the bearing 163. At least a portion of the bearing 221 and at least a portion of the bearing 163 are at the same position in the right-left direction.

As described above, with the structural arrangement of the present preferred embodiment, the annular one-way clutch 220 and the bearing 221 are both located between the input shaft portion 204 of the clutch input shaft 158 and the output shaft portion 208 of the clutch output shaft 159. The one-way clutch 220 and the bearing 221 are thus located in proximity to each other in the axial direction A. Coaxial precision required of the input shaft portion 204 and the output shaft portion 208 that support the one-way clutch 220 is thus secured by the bearing 221. Further, inner circumferential portions of the one-way clutch 220 and the bearing 221 are supported by a common member, that is, the input shaft portion 204. In this case, a mounting error of the one-way clutch 220 with respect to the input shaft portion 204 and a mounting error of the bearing 221 with respect to the input shaft portion 204 do not cumulatively affect the coaxial precision of the clutch input shaft 158 and the clutch output shaft 159 that support the one-way clutch 220. Therefore, the required coaxial precision is secured without having to take considerable steps, such as highly precise setting of the position of the clutch input shaft 158 and the clutch output shaft 159 and advanced tolerance control of these shafts. Due to the above structural arrangement, even if considerable steps are not taken in the manufacturing process of the clutch structure 155, a distance X between the input shaft portion 204 and the output shaft portion 208 (see FIG. 8) is uniform in the circumferential direction S and therefore displacements of the respective cams 224 in the one-way clutch 220 are smooth. The one-way clutch 220 is thus made ON or OFF accurately and reliable actuation of the one-way clutch 220 is readily secured.

According to a preferred embodiment of the present invention, the one-way clutch 220 and the bearing 221 respectively contact the first outer circumferential surface 204B and the second outer circumferential surface 204C which define an outer circumferential surface of the input shaft portion 204. A structural arrangement is thus provided such that a mounting error of the one-way clutch 220 with respect to the outer circumferential surface of the input shaft portion 204 and a mounting error of the bearing 221 with respect to the outer circumferential surface of the input shaft portion 204 do not cumulatively affect the coaxial precision of the clutch input shaft 158 and the clutch output shaft 159.

According to a preferred embodiment of the present invention, the one-way clutch 220 and the bearing 221 respectively contact the first inner circumferential surface 208E and the second inner circumferential surface 208F which define an inner circumferential surface of the output shaft portion 208. A structural arrangement is thus provided such that a mounting error of the one-way clutch 220 with respect to the inner circumferential surface of the output shaft portion 208 and a mounting error of the bearing 221 with respect to the inner circumferential surface of the output shaft portion 208 do not cumulatively affect the coaxial precision of the clutch input shaft 158 and the clutch output shaft 159.

According to a preferred embodiment of the present invention, the one-way clutch 220 and the bearing 221 are located adjacent to each other in the axial direction A. The coaxial precision required of the input shaft portion 204 and the output shaft portion 208 that support the one-way clutch 220 is thus secured by the bearing 221. Reliable actuation of the one-way clutch 220 is thus secured.

According to a preferred embodiment of the present invention, the bearing 221 is located between the one-way clutch 220 and the bearing 163 in the axial direction A. The one-way clutch 220 and the bearing 221 are thus reliably located adjacent to each other in the axial direction A.

According to a preferred embodiment of the present invention, at least a portion of the bearing 221 overlaps with the bearing 163 when viewed from the radial direction R. The one-way clutch 220 and the bearing 221 are even more reliably located adjacent to each other in the axial direction A.

According to a preferred embodiment of the present invention, the inner diameter D1 of the one-way clutch 220 and the inner diameter D2 of the bearing 221 are the same or substantially the same. The respective inner circumferential portions of the one-way clutch 220 and the bearing 221 are thus located collectively at portions 204B and 204C that are the same or substantially the same in outer diameter of the common input shaft portion 204. The one-way clutch 220 and the bearing 221 are thus located in proximity in the axial direction A. The coaxial precision required of the input shaft portion 204 and the output shaft portion 208 that support the one-way clutch 220 is thus secured by the bearing 221, therefore securing reliable actuation of the one-way clutch 220.

According to a preferred embodiment of the present invention, the input shaft portion 204 which is splined to the crankshaft 122 is fixed to the crankshaft 122 by the bolt 200 so as not to become detached from the crankshaft 122 and inadvertently shift in the axial direction A.

According to a preferred embodiment of the present invention, a threaded portion which would need to be provided on an outer circumferential surface of the crankshaft 122 if a nut is used in place of the bolt 200, is unnecessary, thus enabling a dimension of the crankshaft 122 in the axial direction A to be small. Further, the bolt 200 which is an elongated member, is more readily twisted during rotation of the crankshaft 122 and the clutch input shaft 158 than a nut. When the bolt 200 is twisted, the threaded portion 200B of the bolt 200 engages firmly with a threaded portion of the threaded hole 154C of the crankshaft 122, thus preventing loosening of the bolt 200.

Although preferred embodiments of the present invention have been described above, the present invention is not restricted to the contents of these preferred embodiments and various modifications are possible within the scope of the present invention.

As the one-way clutch 220, a structure other than a cam clutch may be used.

In the clutch structure 155, the bearing 221 may be located adjacent to the one-way clutch 220 on the right instead of adjacent thereto on the left.

The clutch structure 155 preferably transmits the rotational power intermittently between the crankshaft 122 and the primary shaft 157 of the continuously variable transmission 78. The secondary shaft 123 may be divisible into a left portion included in the continuously variable transmission 78, and a right portion included in the transmission 79. In this case, the left portion of the secondary shaft 123 is an example of the drive shaft according to a preferred embodiment of the present invention and the right portion of the secondary shaft 123 is an example of the input shaft according to a preferred embodiment of the present invention. The input shaft portion 204 of the clutch structure 155 is linked to the left portion of the secondary shaft 123. The output shaft portion 208 of the clutch structure 155 is linked to the right portion of the secondary shaft 123. The clutch structure 155 transmits the rotational power intermittently between the left portion of the secondary shaft 123 and the right portion of the secondary shaft 123.

The bearing 221 may be a ball bearing or a roller bearing, etc., instead of a needle bearing.

Although two seats 5 are aligned in the right-left direction, three or more seats 5 may be aligned the right-left direction.

The vehicle 1 preferably includes the pair of front wheels 2L and 2R and the pair of rear wheels 3L and 3R. However, a vehicle according to a preferred embodiment of the present invention may include two or more pairs of front wheels 2 and may include two or more pairs of rear wheels 3.

Although the vehicle 1 is preferably a recreational off-road vehicle, a vehicle to which the clutch structure of the present invention is applied may be a utility vehicle of any category. A general utility vehicle includes a frame structure and vehicle wheels suited for off-road travel.

Also, features of two or more of the various preferred embodiments described above may be combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A clutch structure comprising:
   a clutch input shaft including an input shaft portion defined by a single unitary component and connected to a drive shaft, and a first flange portion extending outward in a radial direction from the input shaft portion;
   a clutch output shaft located coaxially with the clutch input shaft and including a cylindrical portion surrounding the first flange portion in a circumferential direction, a second flange portion extending inward in the radial direction from the cylindrical portion, and an output shaft portion coupled to the second flange portion;
   a weight member supported by the first flange portion so as to be movable in the radial direction that frictionally contacts an inner circumferential surface of the cylindrical portion by centrifugal force to transmit a rotational power from the clutch input shaft to the clutch output shaft when a rotational frequency of the clutch input shaft exceeds a predetermined value, and that separates from the inner circumferential surface of the cylindrical portion to disconnect transmission of the rotational power from the clutch input shaft to the clutch output shaft when the rotational frequency of the clutch input shaft becomes not more than the predetermined value;

an annular one-way clutch located between the input shaft portion and the output shaft portion to link the input shaft portion and the output shaft portion when the weight member separates from the inner circumferential surface of the cylindrical portion and the rotational frequency of the clutch input shaft falls below a rotational frequency of the clutch output shaft; and an annular first bearing located between the input shaft portion and the output shaft portion and supporting the input shaft portion and the output shaft portion so as to be relatively rotatable; wherein both an inner circumferential portion of the annular one-way clutch and an inner circumferential portion of the annular first bearing contact the input shaft portion.

2. The clutch structure according to claim 1, wherein the one-way clutch and the first bearing contact an outer circumferential surface of the input shaft portion.

3. The clutch structure according to claim 1, wherein the one-way clutch and the first bearing contact an inner circumferential surface of the output shaft portion.

4. The clutch structure according to claim 1, wherein the one-way clutch is located adjacent to the first bearing in an axial direction of the clutch input shaft.

5. The clutch structure according to claim 4, further comprising:
a second bearing surrounding and rotatably supporting the output shaft portion; wherein
the first bearing is located between the one-way clutch and the second bearing in the axial direction.

6. The clutch structure according to claim 5, wherein at least a portion of the first bearing overlaps with the second bearing when viewed from the radial direction.

7. The clutch structure according to claim 1, wherein an inner diameter of the one-way clutch and an inner diameter of the first bearing are the same or substantially the same.

8. The clutch structure according to claim 1, further comprising a connector that connects the input shaft portion to the drive shaft.

9. The clutch structure according to claim 8, wherein the connector includes a bolt, and at least a portion of the bolt is located inside the input shaft portion.

10. The clutch structure according to claim 1, wherein the first bearing is a needle bearing.

11. The clutch structure according to claim 1, wherein the drive shaft is a crankshaft of an engine.

12. The clutch structure according to claim 1, wherein the output shaft portion is linked to an input shaft of a shiftable transmission that transmits a rotational power from the drive shaft to a vehicle wheel.

* * * * *